US005153837A

United States Patent [19]

Shaffer et al.

[11] Patent Number: 5,153,837

[45] Date of Patent: Oct. 6, 1992

[54] UTILITY CONSUMPTION MONITORING AND CONTROL SYSTEM

[75] Inventors: Robert Shaffer, Fort Wayne, Ind.; Thomas W. Thorpe, Monument, Colo.

[73] Assignee: Sleuth Inc., Fort Wayne, Ind.

[21] Appl. No.: 594,354

[22] Filed: Oct. 9, 1990

[51] Int. Cl.[5] .......... G06F 15/20

[52] U.S. Cl. .......... 364/464.04; 324/103 R; 364/483

[58] Field of Search .......... 324/103 R, 113; 364/464.01, 464.04, 465, 483

[56] References Cited

U.S. PATENT DOCUMENTS

| | | | |
|---|---|---|---|
| 4,002,890 | 11/1977 | Welin | 364/464.04 |
| 4,080,568 | 3/1978 | Funk | 324/142 |
| 4,120,031 | 10/1978 | Kincheloe et al. | 364/464.04 |
| 4,261,037 | 4/1981 | Hicks | 364/464.04 |
| 4,291,376 | 9/1981 | McCahill | 364/483 |
| 4,473,797 | 9/1984 | Shiota | 364/571.04 X |
| 4,489,220 | 12/1984 | Oliver | 379/107 X |
| 4,504,831 | 3/1985 | Jahr et al. | 340/870.11 X |
| 4,575,801 | 3/1986 | Hoberman et al. | 364/483 |
| 4,577,977 | 3/1986 | Pejsa | 374/39 |
| 4,591,988 | 5/1986 | Klima et al. | 374/39 X |
| 4,639,876 | 1/1987 | Deeds | 364/483 |
| 4,675,828 | 6/1987 | Winston | 364/483 |
| 4,707,852 | 11/1987 | Jahr et al. | 340/870.03 X |
| 4,803,632 | 2/1989 | Frew et al. | 364/464.04 |
| 4,804,957 | 2/1989 | Selph et al. | 379/107 X |
| 4,862,493 | 8/1989 | Venkataraman et al. | 364/900 X |
| 4,990,893 | 2/1991 | Kiluk | 364/554 X |
| 5,079,715 | 1/1992 | Venkataraman et al. | 364/483 X |

*Primary Examiner*—Parshotam S. Lall
*Assistant Examiner*—Edward R. Cosimano
*Attorney, Agent, or Firm*—Baker & Daniels

[57] ABSTRACT

The present invention is a digital and analog system for generating an energy log for instant recall and display. The system is permanently programmed in read-only memory with the task of scanning sensor inputs, performing consumption calculations, updating the non-volatile memory, responding to external commands, and monitoring peripheral performance. The stored information is available for real-time query of individual sensor data or as a composite hard copy report on a month-to-date or month-end basis. The apparatus accepts inputs from both analog and digital sensors whose outputs produce information related to data such as current consumption, water consumption, or fuel consumption and provides an optional interface for the control of these functions based on pre-programmed upper/lower limits. Based on the various inputs, data is stored in specified memory locations and consumption rates and costs are computed based on sensor calibration factors and energy cost factors stored in non-volatile memory at the time of calibration. The system is programmed to detect invalid data and failed sensor inputs in addition to automatically calibrating.

20 Claims, 12 Drawing Sheets

UTILITY CONSUMPTION MONITORING AND CONTROL SYSTEM

BACKGROUND OF THE INVENTION

The present invention relates to systems for monitoring utility consumption, such as electricity, gas, and water. More specifically, the field of the invention is that of utility monitoring systems for multi-occupant dwellings such as apartments or small businesses.

Many multi-occupant dwellings (i.e. large apartment complexes) and small businesses have been constructed with central metering systems for metering utility consumption by occupants. In this environment, individual occupant consumption can not be determined and thus the incentive, on the part of the occupant, to conserve utility based resources is minimal. The result may well be increased consumption of resources by some individuals which thereby provides a financial inequality to those other individuals prone to conserve.

Conventional central metering systems include a microprocessor which monitors utility consumption and outputs various usage and billing information. These prior art systems provide a basis for allocating costs and locating potential problems. The microprocessor exactly calculates the utility usage; however, these calculations can be no more accurate than the external metering from which the usage data is derived. Thus, problems exist with such conventional systems.

One problem with conventional systems is that no provision is made for the changing characteristics of the metering output over time, e.g., the slowing of a flow meter due to aging. Another problem is that conventional systems are designed for use with specific metering equipment. This limits the available replacement parts for repair of the metering equipment, as well as increases the difficulty of retrofitting a dwelling with such a system.

What is needed is a central metering system which adapts to the changing conditions of the metering equipment.

Also needed is a central metering system which can be used with a variety of metering equipment.

SUMMARY OF THE INVENTION

The present invention is a digital and analog apparatus comprising a microcomputer including a microprocessor having an interrupt capability with associated read-only memory, non-volatile random access memory, real-time clock, analog-to-digital converter (A/D), anti-tamper circuitry, watch-dog counter, data, address, and control buses. In addition, the microcomputer contains circuitry for detection of failed sensors or unauthorized penetration of the apparatus. The software in the read-only memory provides for a multi-level secure user validation, on-site self-calibration of sensors, storage of utility cost and consumption data, detection of out-of-tolerance conditions, continuous self-test of the apparatus, printer, alarm, and display control in an automated non-attended environment.

Low cost utilities are no longer available. Businesses and individuals are seeking ways to conserve natural resources provided by utility companies. Unless users can monitor utility consumption on a demand basis, the tendency is to accept the consumption rates rather than to implement measures to control or minimize utilization. The system allows for central monitoring of utility consumption thus allowing for real-time correction of excessive or non-existent utility consumption. For example, if excessive natural gas consumption existed in a specific location, measures could be immediately taken to determine if the condition were due to a failed sensor or blatant misuse of resources. Should recorded consumption be non-existent when environment conditions would indicate consumption, then an investigation could be performed to determine if sensor failure had occurred or a risk existed to the property relative to frozen pipes, etc. The system recalls utility consumption on a daily or monthly basis with the ability to monitor, detect, alarm, or control on the existence of out-of-tolerance conditions. Because of the real-time clock, out-of-tolerance problems can be hard-copied and time-stamped without on-site intervention and hourly trend data can be provided automatically for recording or plotting peak utility consumption data.

The purpose of the present invention is to provide a desk-top, wall mounted, or panel mounted utility consumption monitoring system for the recording and control of utility consumption of individual dwellings in a multi-occupant environment. The system continuously monitors and logs the individual occupant consumption of electricity (power), natural gas, hot water heat (by differential temperature measurement), and domestic water; and it is further adaptable to a variety of other types of measurement. The system provides both consumption and cost data providing the owner with a means to proportion utility costs on a preprogrammed or radiometric basis. To provide an equitable distribution of costs, the apparatus provides alarm indications relative to its physical penetration, attempted variable/-data modification, sensor failure/disconnect, or out-of-limits consumption on a per metered area basis. To provide a more accurate measurement, the system calibrates on-site and performs self-tests to facilitate interfacing with parametrically differing sensor interfaces even within a specific sensor group.

A keypad allows a user to query input and to program the system parameters. A multi-digit display is provided with the keypad for real-time retrieval of data stored in memory. The keypad and display are under the control of the microprocessor via interface control circuitry which is interfaced to the microprocessor address and data bus.

Programmable digital I/O controllers interface with the microprocessor thereby reading the digital inputs and controlling the digital outputs. Analog inputs are controlled through a Field Effect Transistor (FET) switch array matrix which is routed directly to an analog-to-digital (A/D) converter or through a 60 Hz band-pass filter/RMS to DC converter to the A/D converter. Analog inputs are also optionally routed to a Frequency to Voltage (F/V) converter and then on to the A/D converter providing flexibility to interface with a variety of sensors to accommodate possible changes in the economic climate and technological sensor advances.

The real-time clock provides both time-stamping data, power failed data, and data update control for maximum system performance and maximum memory life. The software in ROM supports both a polled and interrupt driven system for sensor recording. The microprocessor software is multi-tasking which allows the sensor interfaces to continue independently of any keypad inquiries, hard-copy output activity, or alarm activation. Thus, under the control of one task, the microprocessor dedicates itself to purely processing sensor inputs, data recording, and output control as applicable; and under the control of the second task, the microprocessor dedicates itself to peripheral response related to operator keypad intervention or alarm servicing.

The system is capable of not only the real-time reading, computation, and update of consumption data, but is also capable of calibrating sensors and compensating for component offsets by storing variables and constants in non-volatile memory. This avoids the problem of calibration during the manufacturing and the specialized calibration equipment needed during on-site installation processing. Because of its programmable outputs and flexible input configurations, full performance and functionality validation can occur at the manufacturing facility or on-site without the need for specialized test equipment. Additionally, because of the socketed non-volatile memory, apparatus change-out can occur without the specified need for full re-calibration by simply changing out the non-volatile memory or retrieving the contents of the memory for reprogramming of a replacement unit as appropriate.

One object of the present invention is to provide a central metering system which adapts to the changing conditions of the metering equipment.

Another object is to provide a central metering system which can be used with a variety of metering equipment.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplification set out herein illustrates one preferred embodiment of the invention, in one form, and such exemplifications are not to be construed as limiting the scope of the invention in any manner.

DESCRIPTION OF THE PREFERRED EMBODIMENT

Figure 1:
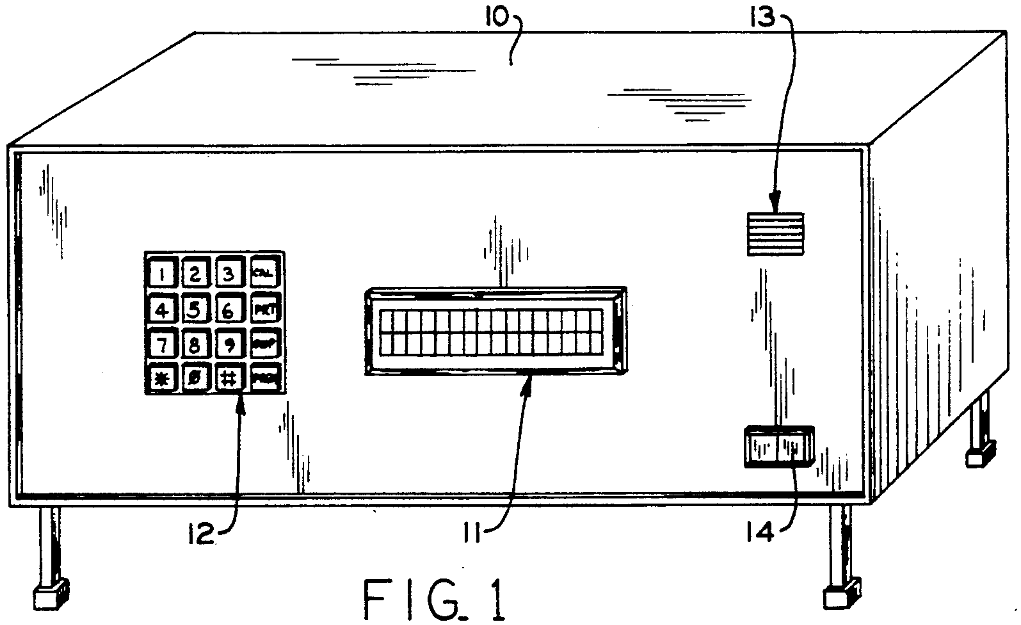
FIG. 1 is a perspective view of a cabinet having a keypad and display for enclosing the remaining portions of the apparatus of the present invention.

Referring to FIG. 1, the present invention includes cabinet 10 having on which display board 11 and keypad 12 are mounted. Keypad 12 has a plurality of touch operated keys including numerical keys (0 through 9) and special function keys. Additionally, alarm 13 and power switch 14 are located on cabinet 10. Keypad 12 serves as a simple multiple key entry device which permits data retrieval and entry by the use of the CAL, PRT, DISP, PRGM, #and * keys in conjunction with other numeric input keys. Display board 11, being an alphanumeric display, permits the display of both numeric and a full alpha character set as visual feedback to the operator using keypad 12. Specialized attributes of display board 11 may serve as a traditional data separators or may serve as system integrity indicators to permit rapid validation that the apparatus and interfaces are functioning normally, for example by use of an inverse or blinking display capability.

Figure 2:
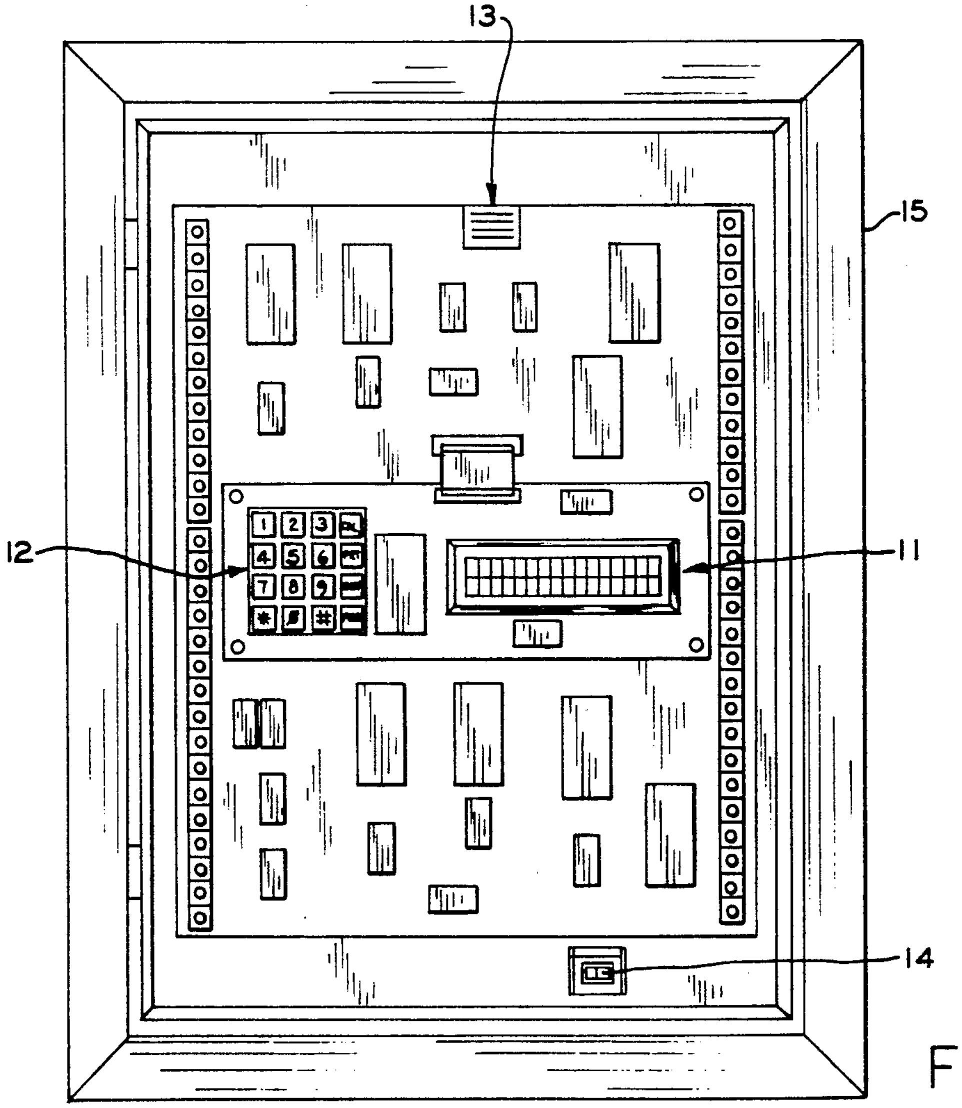
FIG. 2 is a perspective view of a panel installation having a keypad, display, and the remaining portions of the apparatus of the present invention.

Referring now to FIG. 2, display board 11 and keypad 12, with the alarm 13, power switch 14, and the main microprocessor/peripheral circuitry 16, are mounted in panel enclosure 15, which is typically an electrical panel. The functionality discussed with respect to FIG. 1 is similar to that of FIG. 2, but the packaging of the apparatus differs.

Figure 3:
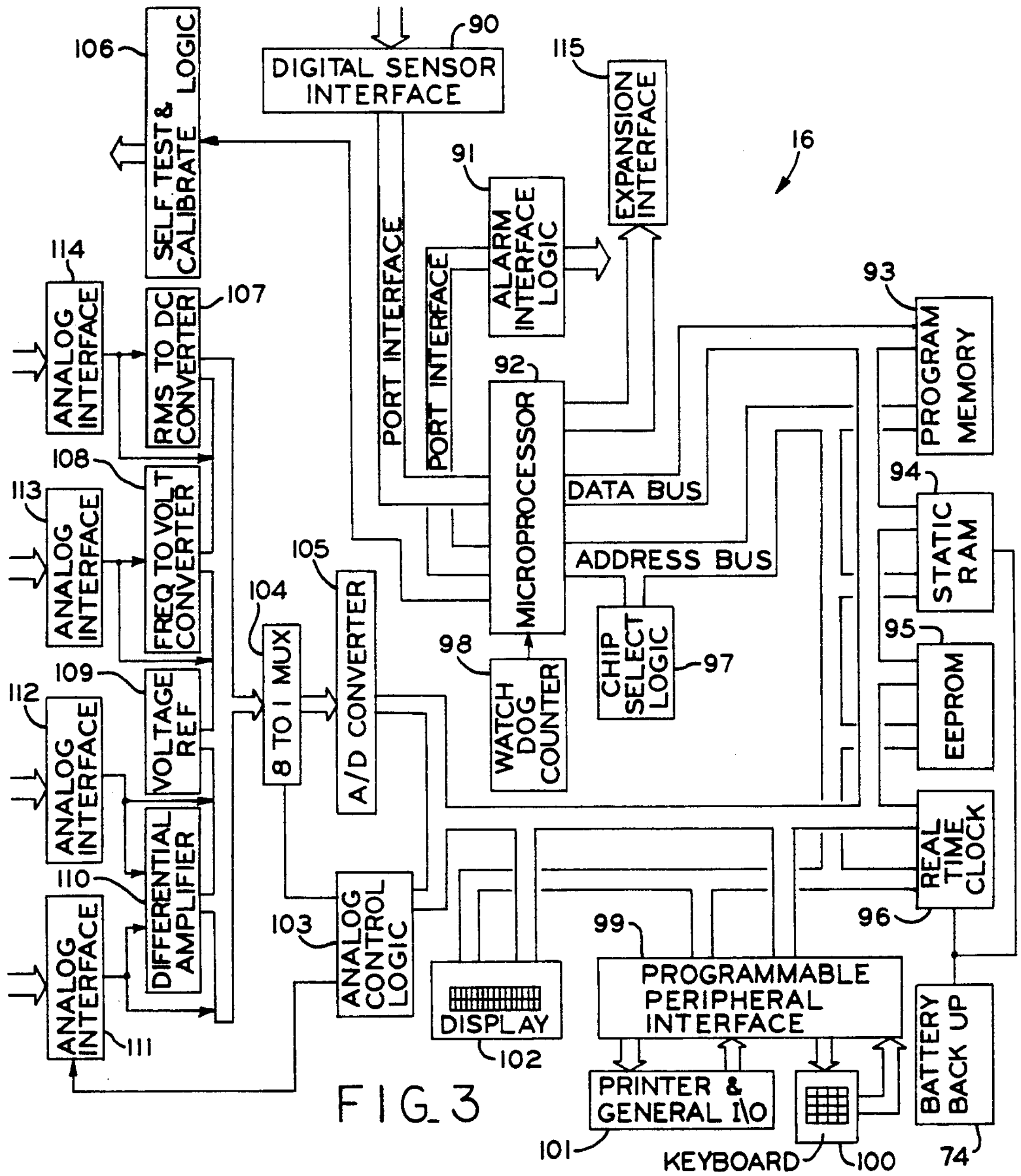
FIG. 3 is block diagram of the microprocessor and the associated peripherals.

Referring to FIG. 3, the microcomputer of the present invention comprises a microprocessor 92 combined with associated peripheral support. The interfacing peripherals include program memory 93 comprising an EPROM type device, static CMOS RAM 94, EEPROM 95 for non-volatile data retention and storage without needing battery backup, real time clock 96 for measurement timing and time of day reference, programmable peripheral interface 99 which controls matrixed keypad 100, general I/O-printer interface 101, and a display module 102 for real-time display of data. Microprocessor 92 interfaces with A/D converter 105 whose inputs are from voltage reference 109 and analog sensors, specifically sensor groups 111, 112, 113, and 114 under the control of analog control logic 103. The output of sensor groups 111, 112, 113, and 114 is fed either directly to the 8 to 1 analog multiplexer 104, or through a differential amplifier 110 for differential temperature measurement, or through frequency to voltage converter 108 for flow rate data, or through a RMS to DC converter 107 for amplitude sensitive measurements such as the voltage representation of current flow. Additionally, digital information is input through digital interface 90 for measuring frequency oriented digital sensors. Additional interfaces include anti-tamper and alarm interface 91, memory mapped I/O control logic 97, and watchdog counter/under-voltage detector 98. The analog circuitry is self calibrating and self-testing as a result of self-test and calibrate logic 106. FIG. 3 represents the major interfaces to and from microprocessor 92 which is the master controller of the system. The microprocessor can interface with other similar circuitry for expanded functionality or sensor inputs via an expansion interface 115. This is implemented by a high speed data interface for use in a master/slave arrangement.

Figure 4:
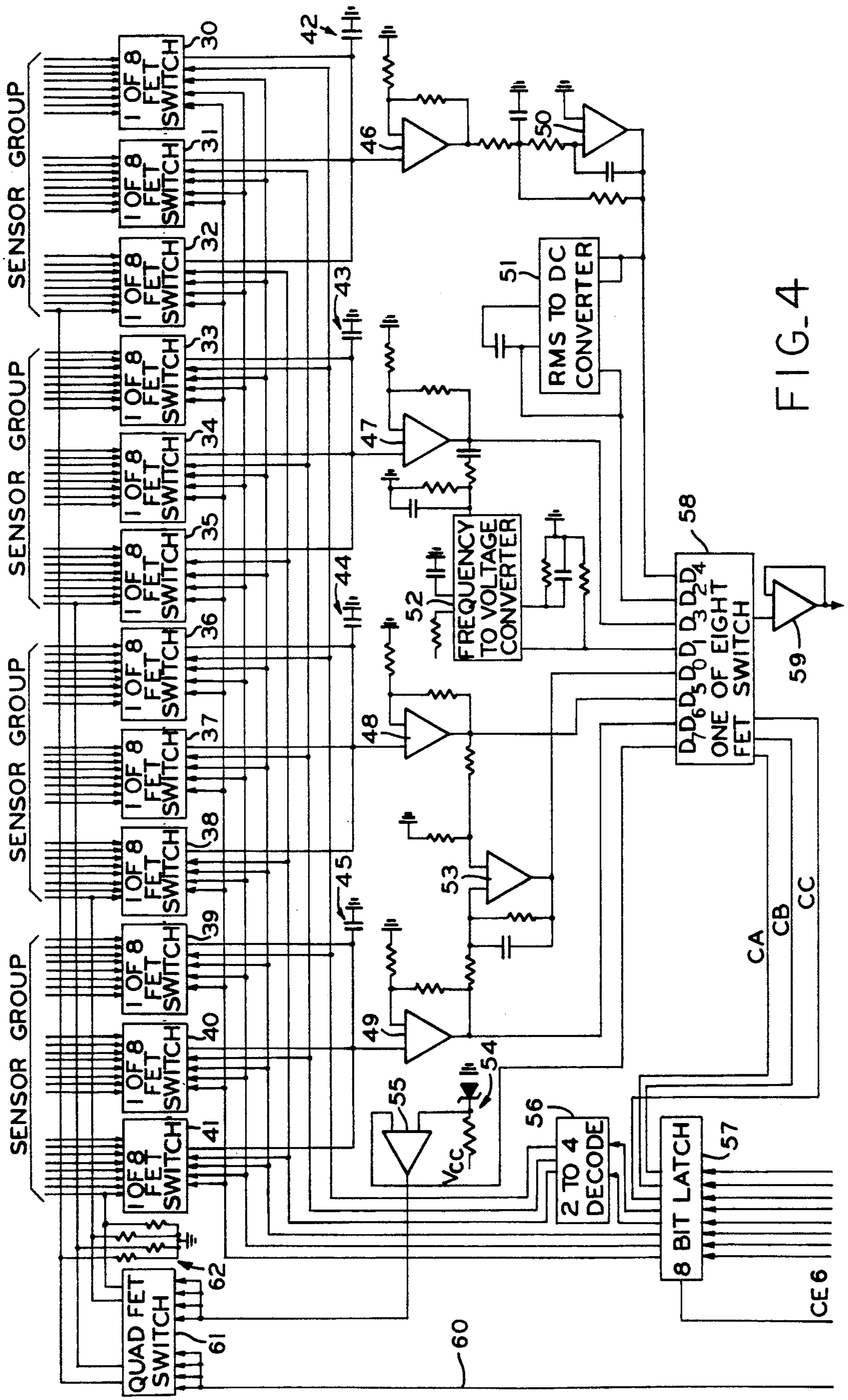
FIG. 4 is a schematic diagram depicting the interface of the analog inputs.

Referring to FIG. 4, the analog interface includes four major sensor inputs. Two inputs comprise high temperature and low temperature signals which are combined to produce a differential temperature input. The other two inputs are gas consumption and power consumption (current measurement). Each input type includes 24 analog input lines, which is the maximum number of input lines in the exemplary embodiment of the present invention. To monitor more than 24 inputs, multiple sensor groups may be used and may be interconnected as slave units to a unit designated as a master unit. Alternately, sensor groups having a larger input set can be designed within the spirit and scope of the present invention.

In the exemplary embodiment, a group of 24 inputs is referred to hereafter as a SENSOR GROUP comprising the input lines and three 1 of 8 Field Effect Transistor (FET) analog switches: 30, 31, and 32; 33, 34, and 35; 36, 37, and 38; & 39, 40, and 41; which are controlled and configured with any one of twenty-four (24) inputs capable of being selected. This provides the functionality of a 24 to 1 analog multiplexer. The control of the analog multiplexing function is digitally realized by the settings of bits A, B, C, originating from eight bit latch 57 under the control of microprocessor 92. EN1, EN2, and EN3 are produced by outputs from 8 bit latch 57 via 2 to 4 decoder 56 and select which of the three SENSOR GROUPs will be active; and A, B, and C select which of the eight inputs of the selected SENSOR GROUP will be active. This arrangement allows for five bits (the two input into decoder 56 and lines A, B, and C which are directly coupled to the internal logic of the FET switches) to address any of the 24 inputs of a selected SENSOR GROUP.

SENSOR GROUPs are connected in parallel providing for simultaneous active outputs from each SENSOR GROUP. The inputs of each SENSOR GROUP are conditioned and transformed in various ways, as described below, and applied to the input of 1 of 8 FET switch 58 which is under the control of the high order three bits of 8 bit latch 57 (lines CA, CB, and CC). The circuitry of FIG. 4 provides the functionality of a digitally controlled analog multiplexer.

The SENSOR GROUP providing the inputs to 1 of 8 FET switches 30, 31, and 32 provides an interface with external power consumption sensing circuitry (not shown). The power consumption sensing circuitry senses a voltage representation of current which allows the mathematical determination of power consumption. The SENSOR GROUP 33, 34, and 35 provides an external interface to the natural gas flow interface (not shown) which can be in the form of flow sensing circuitry which produces a frequency or analog voltage signal. The SENSOR GROUPs 39, 40, and 41; and 36, 37, and 38 provide an external interface to a differential temperature sensor interface 110. The invention provides an interface adapted to receive and process inputs having different communication schemes such as voltage variation, frequency variation, current variation, etc.

Each of the SENSOR GROUPs is low pass filtered to reduce high frequency noise. The low-pass filter comprises a 20 DB/decade filter which includes the on-resistance of the FET switch (approximately 1000 Ohms) in conjunction with a filter capacitor, on the output of the FET switch, to ground 42, 43, 44, and 45. This filter becomes necessary when driving into the non-inverting amplifiers 46, 47, 48, and 49 which provide a high impedance load to the FET switches to minimize the DC losses associated with FET on-resistance. This non-inverting amplifier design provides a high impedance input to a SENSOR GROUP and a low impedance output to the inputs of 1 to 8 source selector FET switch 58 or as a low impedance source to drive to intermediate circuitry (described below).

Intermediate circuitry between one of the SENSOR GROUPs and FET switch 58 includes differential amplifier 53, which provides a single output to the 1 of 8 source selector FET switch 58 indicating the differential temperature being measured. Also, the output of non-inverting amplifier 47 provides a low impedance source for time varying signal which is capacitively coupled to frequency to voltage converter 52, which provides an analog voltage to the 1 of 8 source selector FET switch 58. Power monitoring circuitry includes a non-inverting amplifier 46 for providing a low impedance drive for time varying signals to 60 Hz low pass filter 50 which is connected to a true RMS to DC converter 51 whose output is connected to the 1 of 8 source selector FET switch 58. The following circuits facilitate adaptation to a variety of different possible sensor types which may provide differing external interfaces: 60 HZ low-pass filter 50, RMS to DC converter 51, non-inverting amplifier for natural gas consumption 47, frequency to voltage converter 52, differential temperature amplifier 53, low side temperature sensor 48, high side temperature sensor 49, and calibration standard 54 and 55 voltage reference; and they are all connected as inputs to the 1 of 8 source selector FET switch 58.

The inputs to 1 of 8 source selector FET switch 58 are controlled by the three high order bit settings of 8 bit latch 57 which permits the CA, CB, and CC inputs to select any one of the eight inputs and route the input to voltage follower amplifier 59 for interface as the analog input to Analog-to-digital (A/D) converter 105 under the control of microprocessor 92.

Self-test and self calibration functionality is provided by quad FET switch 61 whose input is the voltage reference produced by voltage follower 55 with the actual quad FET switch control originating from analog self-test control line 60 which is under the control of microprocessor 92. The outputs of quad FET switch 61 are connected to each SENSOR GROUP and provide a calibration reference voltage for all circuits. By this arrangement, a two point (zero voltage and reference voltage) self calibration means is provided for negating gain and offsetting variations in the active circuitry by determining, calculating, and storing gain and offset parameters. Analog self-test control line 60 can also be pulsed at a known rate to provide calibration information to microprocessor 92 related to inaccuracies in the frequency to voltage converter 52, RMS to DC converter 51, and 60 Hz low pass filter 50 for storage and self calibration purposes. In addition, quad FET switch 61 can be used for self-test by the external shorting of each of a SENSOR GROUP's 24 inputs together and verifying proper sensor group functionality and parametric parameters.

Figure 5:
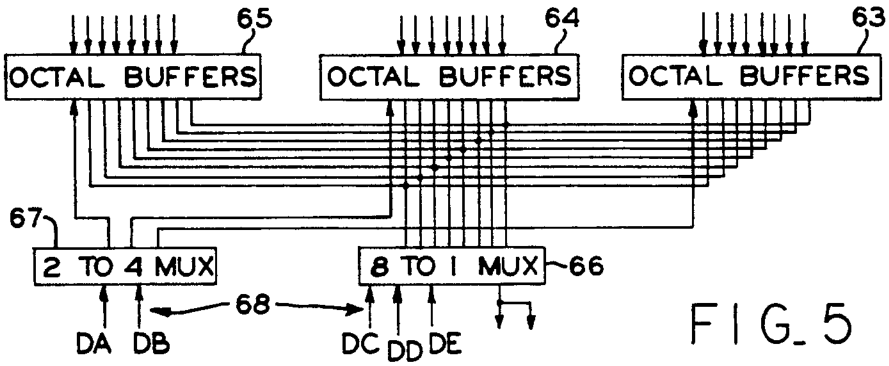
FIG. 5 is a schematic diagram depicting the interface of the digital inputs.
Figure 6:
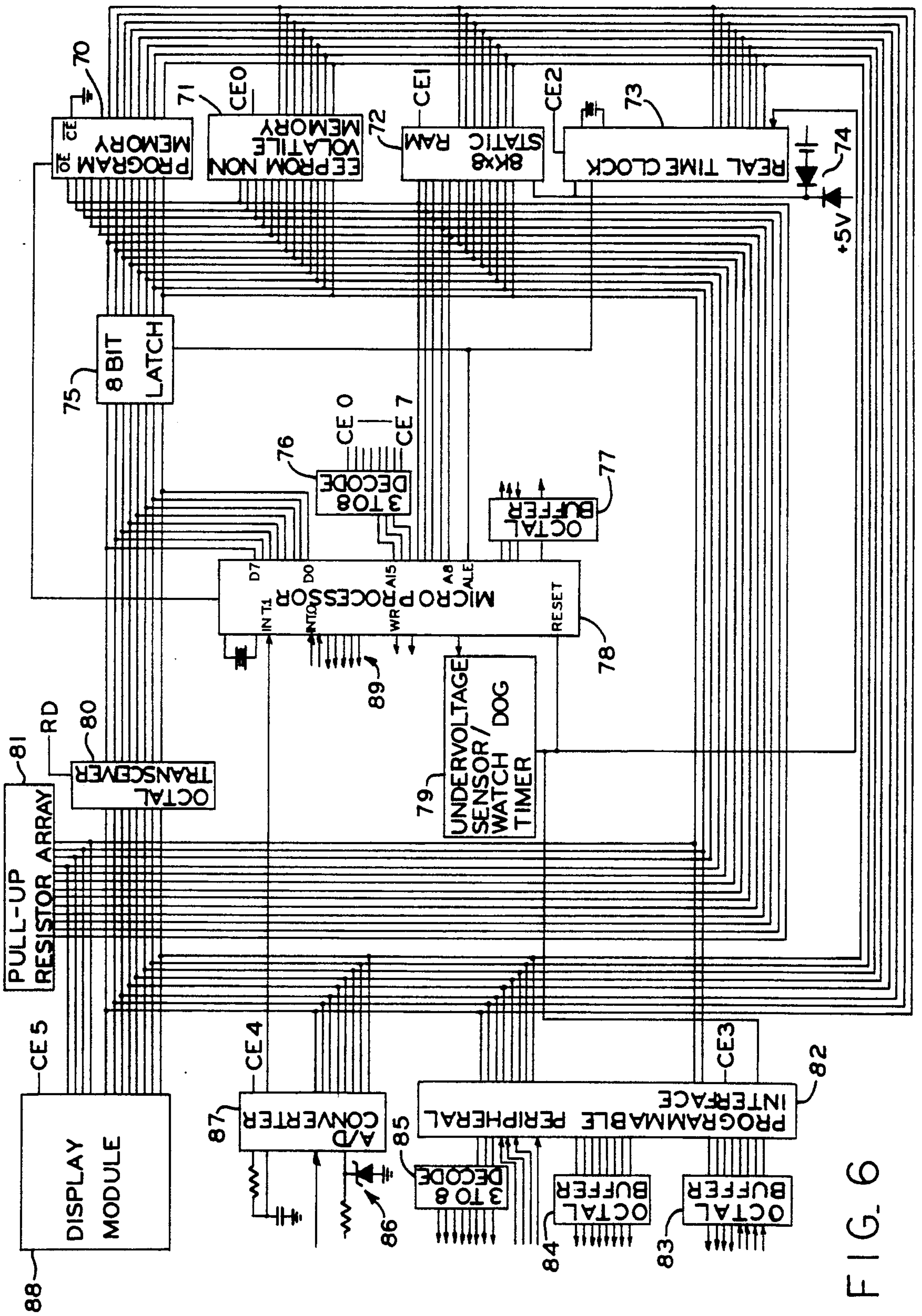
FIG. 6 is a schematic diagram depicting the interface of microprocessor to the peripherals.

Referring to FIG. 5, the digital interface of the system includes three octal buffers 63, 64, and 65 for interfacing with a digital type frequency source. The digital type frequency source might represent a flow rate indicator such as might be found on an incoming water line or may represent a switch closure associated with a thermostat type output. Octal buffers 63, 64, and 65 are schmitt trigger devices providing natural noise immunity and accommodating slow rise and fall times as a result of their dual threshold characteristics. This provides a noise free digital interface to the control circuitry shown in FIG. 6. The outputs of octal buffers 63, 64, and 65 are connected in parallel and serve as the inputs to 8 to 1 multiplexer 66 with octal transceiver 80 interfacing with microprocessor 92 as shown in FIG. 6 and the selection of the output controlled by control or signal lines DC, DD, and DE 68. Octal buffers 63, 64, and 65 have outputs which are tri-state, thus allowing each to be separately selected by 2 to 4 decoder 67 with control lines 68 originating from microprocessor 92. The combination of control lines 68 in conjunction with 2 to 4 decoder 67 and 8 to 1 multiplexer 66 provides a combined functionality of a 24 to 1 digital multiplexer.

Referring to FIG. 6, microprocessor 78 is an 8 bit self contained microprocessor with 16 bits of address space and on-board RAM and optional on-board PROM/-ROM. The microprocessor 78 includes a digital interface 89 coupled to the digital interface logic of FIG. 5. Additionally, the analog control interface includes the functionality of an analog self-test control via the octal buffer 77 and analog-to-digital converter 87. The input to analog-to-digital converter 87 originates from the analog interface section as shown in FIG. 4. Also, voltage reference 86 is an input to analog-to-digital converter 87. Microprocessor 78 also provides a digital output control interface via programmable peripheral controller 82 and octal buffers 84 and 83. This digital output control is general purpose in nature and can be used for system control, loopback self-test, and/or printer interface/control. Programmable peripheral controller 82 also provides an interface to 3 to 8 decoder 85 whose output serves as a row or column interface to a matrixed keypad. The return from the keypad is directly input to programmable peripheral controller 82 as indicated in the four input lines directly below and associated with the 3 to 8 decoder. This configuration supports up to a 4 X 8 matrixed, 32 key keypad.

Further interfaces for the microprocessor 78 are included as software in program memory 70 which is a PROM/ROM type device which may contain up to 64K bytes of program memory and is used in situations where the use of on-board ROM/PROM contained within the microprocessor 78 is undesirable from a cost or performance standpoint. Electrically erasable programmable read only memory (EEPROM) 71 and 8K×8 of Complementary Metal-Oxide-Semiconductor (CMOS) Random Access Memory (RAM) 72 serve as permanent non-volatile memory and local scratchpad memory, respectively. The EEPROM 71 stores the various calibration data associated with the analog channels plus specific gain and offset constants necessary for proper apparatus functionality. Because EEPROM 71 has a finite write cycle life to any specific memory location, the 8K×8 CMOS RAM 72 is coupled to battery backup power 74 to permit high speed calculation and extensive data storage to be made in RAM 72 and then stored at a later time into EEPROM 71.

Real time clock 73 is coupled to battery backup 74 and serves as a time-of-day clock for display purposes and memory storage purposes and provides a means to determine the appropriate storage interval for EEPROM 71. In the exemplary embodiment, real time clock 73 is crystal controlled and can be altered by microprocessor 78.

Microprocessor 78 interfaces with display module 88 for purposes of displaying time-of-day, memory data associated with selective or multiple input sensor data, alarm conditions, and self-test (health check) status. Display module 88 may, under some conditions, act as the keypad input source instead of using programmable peripheral interface 82 and 3 to 8 decoder 85 for this purpose. Determination of which input source is preferable depends on component availability, cost, and output interface requirements.

Under-voltage sensor/watchdog timer 79 guards against improper microprocessor initialization, under-voltage shutdown, and internal microprocessor malfunction during operational periods. Under-voltage sensor/watchdog timer 79 assures that proper microprocessor operation is maintained while protecting other peripheral devices and external interface circuitry from improper microprocessor I/O interface.

The various peripherals are controlled using a memory mapped I/O design including a 3 to 8 decoder 76 which controls the selection of individual peripherals. Additionally, octal buffer 77 provides alarm control and anti-tamper control using a dedicated port interface of microprocessor 78.

RAM 72 and real-time clock 73 are coupled to battery backup power 74 with main power being supplied by an external power source. If the external power source is disrupted, the on-board battery of battery backup 74 will take control and retain the memory of RAM 72 and real time clock 73. The loss of power can be tolerated for up to 1000 hours with no risk of data loss in the CMOS RAM and real time clock. The voltage inputs required for proper active circuitry functionality are +5 V (for most operations) and ±5 V (for analog circuitry operations).

The operation of the hardware is exclusively controlled by the tasks or programs stored in PROM/ROM 70. The individual instructions and tasks will vary depending on the microprocessor selected and the specific peripherals integrated with the microprocessor. Generally, any eight bit microprocessor with a multi-task and interrupt capability, is suitable for purposes of the present invention. The following hardware is considered suitable for implementation of this invention.

| INTEGRATED CIRCUIT TYPE | PREFERRED EMBODIMENT |
|---|---|
| Microprocessor | Intel Corporation<br>8031 8 bit self contained, 40 pin DIP |
| PROM | Intel Corporation<br>P27256 32Kx8, 28 pin DIP |
| EEPROM | XICOR Corp.<br>X2864H 8Kx8, 28 pin DIP |
| RAM | SAMSUNG Electronics<br>KM6865LP 8Kx8, 28 pin DIP |
| A/D Converter | National Semiconductor<br>ADC0802/ADC0803/ADC804, 20 pin DIP |
| Programmable Peripheral Interface | Intel Corporation<br>8255A-5, 40 pin DIP |
| 8 to 1 Analog Mux with input protection | Harris Corporation<br>HI-508A, 16 pin DIP |
| Frequency to Voltage Converter | National Semiconductor<br>LM2907/2917, 14 pin DIP |
| RMS to DC Converter | Maxim Integrated Products<br>AD536A/AD636, 14 pin DIP |
| Watchdog counter & under voltage sensor | Maxim Integrated Products<br>MAX690, 8 pin DIP |
| Display module | Philips Corporation<br>LTN211, 2 rows × 16 characters/row |

OPERATION

In the operational description below, each input group and major capability is separately described, specifically detailing the signal flow and processing associated with the aspects of the present invention.

SENSOR GROUPS

Each SENSOR GROUP typically includes analog and digital interfaces capable of processing digital levels, analog levels, and time varying levels. Each SENSOR GROUP is fully general purpose in nature providing the flexibility of adaptive installation in the presence of (1) previously installed sensors, (2) multi-sourced sensors, and (3) installations whose parameters vary as a function of site specific equipment tailoring. This flexibility provides advantages over prior art systems. Specifically, the system can be rapidly adapted for variable sensor performance and variable sensor supply allowing for rapid deployment of new sensors without the need for circuit redesign.

HOT WATER HEAT TEMPERATURE SENSORS AND INTERFACE

Referring to FIG. 4, high side temperature SENSOR GROUP 39, 40, and 41 and low side temperature SENSOR GROUP 36, 37, and 38 monitor hot water lines (not shown). The temperature sensors in each apartment are connected to the inlet and outlet of a hot water heat system. The sensor connected to either side (high or low group) is typically an integrated circuit sensor providing a signal which has voltage as its varying characteristic. The range of voltage variation is typically 10 mv/degree, and may be increased by the use of amplifiers with gains of 10 thus providing a variation of 100 mv/degree centigrade where limited temperature swings are anticipated.

The gain is provided either from the sensor source or through on board amplifiers 48 and 49, depending on noise, distance from sensor to the system, available power at the sensor location, and available sensor sources. The current to power the sensor may be optimally provided by the unit and voltage from the sensor is input onto one sensor group and is routed through the analog multiplexer to high impedance amplifier 49 thus negating the effects on FET channel on-resistance. The sensor groups generally have an inherent delta on-resistance of ±10%, which may vary on the specific circuitry used. This factor, coupled with a part to part variation of typically less than 200 ohms, permits the on-resistance to be used in conjunction with grounded capacitors 44 and 45 to provide a RC low pass filter characteristic which is both predictable and variable within an acceptable range.

The capacitors are approximately 1 uF in value providing a 500 to 800 Hz 3DB roll-off low pass filter characteristic at the rate of 20 DB per decade. The filtered voltage is applied to the high impedance amplifier and amplified at a rate specified by the resistance ratio with the gain being equal to 1+(feedback resistor/input resistor). The voltage produced by amplifiers 48 and 49 is applied to analog 8 to 1 multiplexer 58 whose output is applied to the input of high impedance voltage follower 59 with its output being connected to the input of the analog-to-digital converter 87 shown in FIG. 6. The high and low side of the temperature sensor may represent different voltages based on temperature.

To compensate for sensor variation, the actual temperature, as measured by precision calibration equipment, may be input to microprocessor 78 as a value thus providing a calibration constant for that specified sensor. Thus, the two temperature sensors may be read by the microprocessor and a differential temperature calculation may be made which is directly a function of the energy consumed. Should it not be desirable to compute the differential temperature, the outputs of the two amplifiers are fed into differential amplifier 53 whose output is the difference between the high side sensor and the low side sensor. The difference, representing differential temperature, is applied to the inputs of 8 to 1 analog multiplexer 58 and is made available to analog-to-digital converter 87. Differential amplifier 53 has capacitive filtering on its feedback leg providing an additional noise filtering capability. As an alternate calibration technique to calibrate the two sensors, the temperature sensors may be connected to a single temperature source and the error voltage of the differential amplifier recorded for zeroing the sensor and amplifier errors.

The energy calculation is based on the difference in temperature (delta temp) * flow rate * time * constant. The flow rate is assumed to be either existent (flow) or absent (no flow) but never variable, and is input as a constant at the time of installation for each of the 24 input pairs. If absent (no flow), the inlet and outlet temperature will be the same and no energy is being consumed. When temperature difference exists (flow) then the temperature difference as a function of time provides a measurement of BTU consumed. Should the control voltage, representing flow or no flow, be necessary to monitor for increased accuracy and automated calibration, the voltage is applied to natural gas SENSOR GROUP 33, 34, and 35 so the absence or presence of a flow control signal may be monitored. The natural gas SENSOR GROUP may represent an unused sensor group in the presence of a hot water heat system and thus may be used for this purpose.

NATURAL GAS HEAT CONSUMPTION SENSORS AND INTERFACE

Referring to FIG. 4, the natural gas sensor outputs are connected to SENSOR GROUP 34, 35, and 36 for natural gas utilization. This group represents a 24 to 1 analog multiplexer. The characteristics are the same as for the hot water heat sensor inputs with the same low pass filtering 43 and high impedance amplifier 47 arrangement. The natural gas consumption of an installation may be measured as a function of flow rate or natural gas control valve on time.

Measuring valve on time may give an accurate reading if all the control valves are similar and the natural gas pressure is constant to all valves. The accuracy of flow rate sensors relies on consistency between sensors. Inconsistent sensors may be compensated for by calibrating each input, which disadvantageously requires individual input measurement at the time of installation. Currently low cost flow indicators are in their infancy of development. The alternative to flow indicating sensors is to use differential pressure techniques which, while practical, are relatively inaccurate at low pressure levels. Either a flow indication or differential pressure sensor type is compatible with the present invention.

In the case of differential pressure measurements, the output is a signal which has voltage as its varying characteristic; and when applied to the SENSOR GROUP and amplified by high impedance amplifier 47 provides a voltage to the input of the 8 to 1 analog multiplexer 58. The output of the 8 to 1 analog multiplexer 58 is sent to the analog-to-digital converter 87 via the output of the voltage follower 59.

For flow rate measurements, a flow indicator installation provides a signal having frequency as its varying characteristic to the SENSOR GROUP input which is related in a linear or non-linear fashion to the flow rate and thus the natural gas consumption. The frequency is output, as in the case of the voltage, by the high impedance amplifier 47 and provided as an input to the frequency to voltage converter 52. The frequency to voltage converter 52 provides additional filtering of the incoming frequency and produces an output voltage which is a linear representation of the input frequency. This voltage is applied to the 8 to 1 multiplexer 58 and is sent onto the analog-to-digital converter 87. The system permits the linearization of a non-linear sensor by the use of a linearizing look-up table which can be placed in non-volatile memory 71 for access by microprocessor 78.

POWER CONSUMPTION SENSORS AND INTERFACE

Referring to FIG. 4, the power consumption sensor outputs are connected to power consumption utilization SENSOR GROUP 30, 31, and 32. This SENSOR GROUP functions as a 24 to 1 analog multiplexer. The SENSOR GROUP possesses similar input characteristics and filter characteristics as the others. SENSOR GROUP 30, 31, and 32 accepts either a signal which has voltage level as its varying characteristic or a signal which has amplitude sensitive frequency as its varying characteristic. The power measurement is a computed parameter of assumed voltage * measured current. No attempt is made to compensate for the power factor associated with phase differences between the current and voltage, and thus real power is not computed. The assumption made is that the power factor for residential properties is small and will tend to average out over any given time period.

Conventional sensing techniques dictate the use of current to voltage sensors for measuring current. In a high current environment, as in the case of residential occupants, the currents are too large for in line sensing techniques and thus a clamp-on transformer technique is most practical. The transformer is placed around the wire, or wires in the case of two phase power, whose current is to be sensed and produces a voltage proportional to the current for sensing purposes. The voltage comprises a 60 Hz sine wave whose RMS value is a measure of the current flowing at any time.

An alternative approach involves the use of HALL effect sensors which sense magnetic fields produced around the wire from the current flowing through the wire. The magnetic field is a measure of the current flowing. HALL effect sensors, while less accurate than some conventional transformer sensors, provide either a 60 Hz waveform or a DC level which is a function of the current depending on the sensor electronics used.

The present invention accommodates either type of input. The voltage from a transformer sensor or HALL effect sensor with a 60 Hz characteristic enters the sensor group, is filtered, amplified, and transmitted to the 60 Hz low pass filter 50 with a 40 DB/decade roll-off characteristic. Filter 50 removes high frequency noise or current spikes which are translated to a voltage waveform and become part of the 60 Hz waveform. The output of low pass filter 50 is applied to the 8 to 1 multiplexer 58. If an alternating current input is selected, analog-to-digital converter 87 receives a time varying waveform whose peak amplitude can be measured and the RMS voltage computed using the equation: 0.707 * peak voltage. This technique, while more time consuming, is useful in highly dynamic current environments where digital signal processing techniques may be useful for noise and spike elimination. The 60 Hz waveform is also applied to the input of RMS to DC converter 51 whose output is the DC translation of the true RMS value of the input. The RMS converter output is preferred because it avoids the time investment associated with real time waveform measurement. The output of the RMS to DC converter 51 is also applied to 8 to 1 multiplexer 58 for selection and conversion by analog-to-digital converter 87. The presence of a DC output of the sensor is accommodated by 60 Hz low pass filter 50 and 8 to 1 multiplexer 58.

A low pass filter was used instead of a band pass filter to permit DC components to pass through the filter undisturbed while still acting as a low pass filter to incoming noise. The low pass filter is designed to produce unity gain output. While transformer sensors are generally linear, HALL effect sensors may not be. Any non-linearities are corrected for in microprocessor 78 by the use of linearizing look-up tables. Variations in sensors are compensated for by the use of a sensor calibration constant which represents the current to voltage conversion ratio of the sensor. This data is supplied to the microprocessor memory at the time of installation.

WATER CONSUMPTION SENSOR AND INTERFACE

Referring to FIG. 5, octal buffers 63, 64, and 65 serve as the input source for the measurement of water consumption or any desired utility consumption which has frequency as its varying characteristic. Water consumption is conventionally metered using in-line flow sensor technology. The flow rate of the water is metered using a flow sensor whose output is a signal having a frequency which is a direct function of the flow rate through the sensor. The frequency may be in the form of a digital signal (switch closure or TTL levels) or analog. In either case, a requirement exists for a peak amplitude in excess of 2 VDC. The frequency is applied to octal buffers 63, 64, and 65 then translated to a digital level on their outputs. Because of the possibility of a noisy environment and a slow input waveform rise and fall time, octal buffers 63, 64, and 65 utilize schmitt trigger input circuitry for proper processing of data. The data is under the control of microprocessor 78 and is routed to the timer input of microprocessor 78 via digital 8 to 1 multiplexer 66. Having input in the form of digital data allows for implementing software programming techniques which eliminate any presence of noise in extremely noisy environments. The timer input can be polled or interrupt driven. Because the incoming frequency may be low, the frequency must be computed rather than measured to permit rapid input sensor scanning to occur. As a result, the input to microprocessor 78 can be set up as frequency input source or interrupt driven edge triggered source. The frequency measurement input capability is used for higher input frequencies and the interrupt capability is used for period measurement and frequency calculation where frequency=1/period. Microprocessor 78 is initially programmed to compute periodically and modifies its measurement technique to frequency measurement for input frequencies in excess of 100 Hz or 6000 pulses per minute.

MICROPROCESSOR SIGNAL PROCESSING AND CONTROL

Digital inputs to microprocessor 78 from a SENSOR GROUP originate either as an analog signal or digital signal. Microprocessor 78 (see FIG. 5) receives analog data in a digital format from analog-to-digital converter 87, which microprocessor 78 controls. The digital data is directly input and controlled via dedicated port interface 89. Microprocessor 78 has programming which provides multi-tasking, permitting segmentation of tasks while allowing microprocessor 78 to work one task independent of other concurrent tasks. This capability permits the apparent existence of two related yet seemingly independent microprocessors executing at approximately half the speed of the actual microprocessor. The multi-tasking capability refers tothe single microprocessor allocating time slices toe ach task so that the microprocessor devotes a portio nof its time performing each task. The tasks consist of (1) input sensor data processing and error detection, and (2) peripheral device control and servicing. The peripheral device control includes the functions of display updating, keypad scanning and processing, printer control, and external interface processing and control.

INPUT SENSOR DATA PROCESSING AND ERROR DETECTION

The data from the analog sensor inputs is selected and applied to the input of analog-to-digital (A/D) converter 87. Microprocessor 78 executes a write instruction to A/D converter 87 to begin the data conversion cycle. At the completion of the conversion cycle, A/D converter 87 signals an interrupt to microprocessor 78 to activate the peripheral servicing task, and thus servicing is immediate and minimal time is spent polling for completion of the conversion process. The data is read from A/D converter 87 and stored in a specific memory location, unique to that input, in 8K×8 RAM 72. The peripheral servicing task continues through all active inputs until the cycle is completed.

The data processing task begins again with the next reading being summed with the first. The data processing task is timed using real time clock 73 such that a finite number of samples are taken in any 60 second period. The average is computed for each input and summed in another memory location to provide an hourly average or total which is computed and summed and stored in EEPROM 71 for a daily average or total.

Thus consumption as a function of time or in totality is available on each input for computing and displaying a ratiomatic distribution among other like users, a day by day tracking of consumption, and the assignment of a dollar value based on average consumption of units * time * $/unit, or total consumption * $/unit.

The measurement of the digital interface (reference FIG. 5) for water flow rate is a more difficult and more lengthy process. The problem lies with the metering of very low flow rates and the time associated with periodic calculation. For example, the measurement of a 1 Hz signal may take as long from a period standpoint as from a frequency standpoint with the difference involving the accuracy of the reading.

If the sensor requires a time period which is practically unworkable, a set of analog inputs may be used to measure the zero crossing slope which is a function of frequency. The measurement of thermostatic activity may be rerouted to the digital inputs if necessary, because differential temperature measurement and natural gas are not likely to coexist thereby freeing the former differential temperature measurement lines for use with water flow rate. The zero crossing slope of a sine wave can be computed quickly in terms of (delta V/delta T) which can be accurately approximated to a frequency if the peak amplitude of the waveform is known or can be measured. This analog zero crossing technique, while effective, requires the installation of additional programming in software and a restriction of sensor flexibility.

Error detection is performed by monitoring sensor activity to determine if the activity is within an acceptable range. Specifically, an error is flagged if (1) no activity is observed on a specific sensor over a specified time period (indicating a shorted or failed sensor condition), (2) the reading is erratic (indicating an open or disconnected sensor condition), or (3) the maximum reading is observed for a short period of time (indicating a failed sensor condition or an actual problem within the sensor's monitoring area). The maximum condition is flagged immediately to indicate the possibility of a dangerous condition. Erratic and no reading conditions are flagged within a 24 hour period. The erratic and no reading conditions are based on average data over the previous 24 hour period as compared to the present 24 hour period.

This monitoring technique, while not absolute in determining an error, indicates an abnormal condition and may be ignored by turning off the error condition permanently for a given type of sensor or a specified location. For example, if a unit is vacant, energy consumption may not be of concern and any alarm condition may not be applicable. Similarly, if hot weather prevails and the heating systems are not engaged, then no consumption may be appropriate and an alarm condition might be ignored.

PERIPHERAL DEVICE CONTROL AND SERVICING

Referring to FIG. 6, microprocessor 78 represents an eight bit device with sixteen bits of address space. A specified port supports the higher order address bits (A8 through A15) and the data bus supports the lower order address bits (A0 through A7, sometimes referred to as AD0 through AD7) and the actual data (D0 through D7, sometimes referred to as AD0 through AD7). The lower order address bits are statically latched for use by peripherals using 8 bit latch 75 before sending the eight bits of data. The resulting address bus is made available for peripheral use. The lower 13 bits (A0 through A12) are coupled to pull-up resistor array 81. The upper three bits (A13 through A15) are input to a 3 to 8 decoder 76 which acts as a peripheral selector (chip enable: CE0-CE7) in a memory mapped I/O configuration making data bus contention impossible. The outputs of 3 to 8 decoder 76 are connected to each of the peripherals for peripheral selection over a specified address range when a peripheral select enable (PSEN) line is appropriately set. The first of the peripherals is program memory 70 which includes a 32K to 64K erasable programmable read only memory (EPROM) storing the actual program for execution along with applicable look-up tables associated with specified sensors and keypad key depressions. Program memory 70 is addressed by microprocessor 78 using address lines A0–A15, and does not require the use of a chip select from 3 to 8 decoder 76 thus permitting up to 64K bytes of program memory to exist.

EEPROM 71 is a variable size device being typically a 2K×8 bit configuration expandable to an 8K×8 bit size. The expansion is realized by the printed circuit board being laid out for 8K×8 bits and the applicable use of pin orientation and jumpers upon component insertion into that location. EEPROM 71 stores current month to date consumption data, daily update data (8 updates per day), calibration constants for the various sensors, and miscellaneous useful data (limit data, constants, checksums on data, etc.).

EEPROM 71 represents the peripheral device which can store data without the need for battery backup in case of a power failure or circuit failure, but is limited in that any memory location may only be written to a maximum of 10,000 times. Therefore, by writing sensor data once every three hours a life expectancy of at least three years may be realized. With larger EEPROMs, a means may be provided to use a specified memory address range for a predetermined time period or number of writes, and then selecting a fresh memory address range thereby extending the life expectancy far in excess of three years. Additionally, in the event of a system failure, EEPROM 71 may be removed and placed in a new assembly without the loss of critical data since battery power is not necessary for data retention.

8K×8 RAM 72 includes a CMOS low power RAM under battery backup power. RAM 72 serves as active memory allowing large data storage to occur without any restriction on write cycles. RAM 72 stores all sensor data collected over a three hour period and contains sufficient excess memory as to act a large scratchpad memory for data manipulation and resolution prior to the storage of the data permanently into the EEPROM 71.

Real time clock 73 represents the master timer for the system. Clock 73 provides a data time stamping capability, a mechanism for determining when a sensor scan should commence and when data should be manipulated for permanent storage in EEPROM 71, and an optional time reference for displaying on display module 88. Real time clock 73 does not act as an interrupt source but rather represents a polled source for microprocessor 78. Real time clock 73 employs, in the preferred embodiment, an oscillating crystal time base and is set by keypad command and associated entry data, maintaining information on seconds, minutes, hours, days, day of the week, months, and years. Also, the associated circuitry of clock 73 provides an additional 50 bytes of scratchpad memory to supplement the memory of RAM 72, which like RAM 72 is coupled to a battery backup.

Programmable peripheral interface 82 serves a variety of functions. It serves as (1) general purpose I/O control either to a printer or to external control circuitry, and (2) as a keypad scanner for up to 32 keys. The keypad scanner function is realized in conjunction with 3 to 8 decoder 85 for simultaneous application to a row or column group of the keypad. 3 to 8 decoder 85 provides a zero level on a specified one of its output lines and when a key is depressed, the zero is detected on one of the four input lines to programmable peripheral interface 82. The arrangement of interface 82 allows for interfacing with a variety of types of keypads depending on the desired packaging requirements and supplier availability. Preferably, a 16 key 4×4 matrixed keypad is employed, permitting full functionality without requiring a specialized keypad. The lower sixteen bits of programmable peripheral interface 82 supports a general I/O capability or a specialized printer interface capability or both. The printer interface may be adaptable to a standard parallel printer for the production of hard-copy data relative to specified sensor data or general month end consumption data. Additionally, the printer interface is available for a data dump of the EEPROM 71 for validating the stored variables.

Display module 88 is a microprocessor compatible assembly with the ability to display alphanumeric data related to (1) the time of day, (2) specific sensor consumption data on a specified user, (3) general month end sensor data consumption summaries, and (4) specific conditions related to alarm conditions, system problems, and specialized inquiries. Display modules are well known, and are therefore their particulars are not described in detail below. The preferred display module comprises a Liquid Crystal Display with two lines of alphanumeric data available having sixteen to forty characters per line of display.

RELATED MICROPROCESSOR FUNCTIONALITY AND CONTROL

Microprocessor 78, in addition to sensor scanning and associated data processing, keypad scanning and associated display and printer control, also performs: (1) a self calibration function, (2) a self-test function, (3) an alarm function, and (4) an anti-tamper/security function.

SELF CALIBRATION FUNCTION

Figure 16:
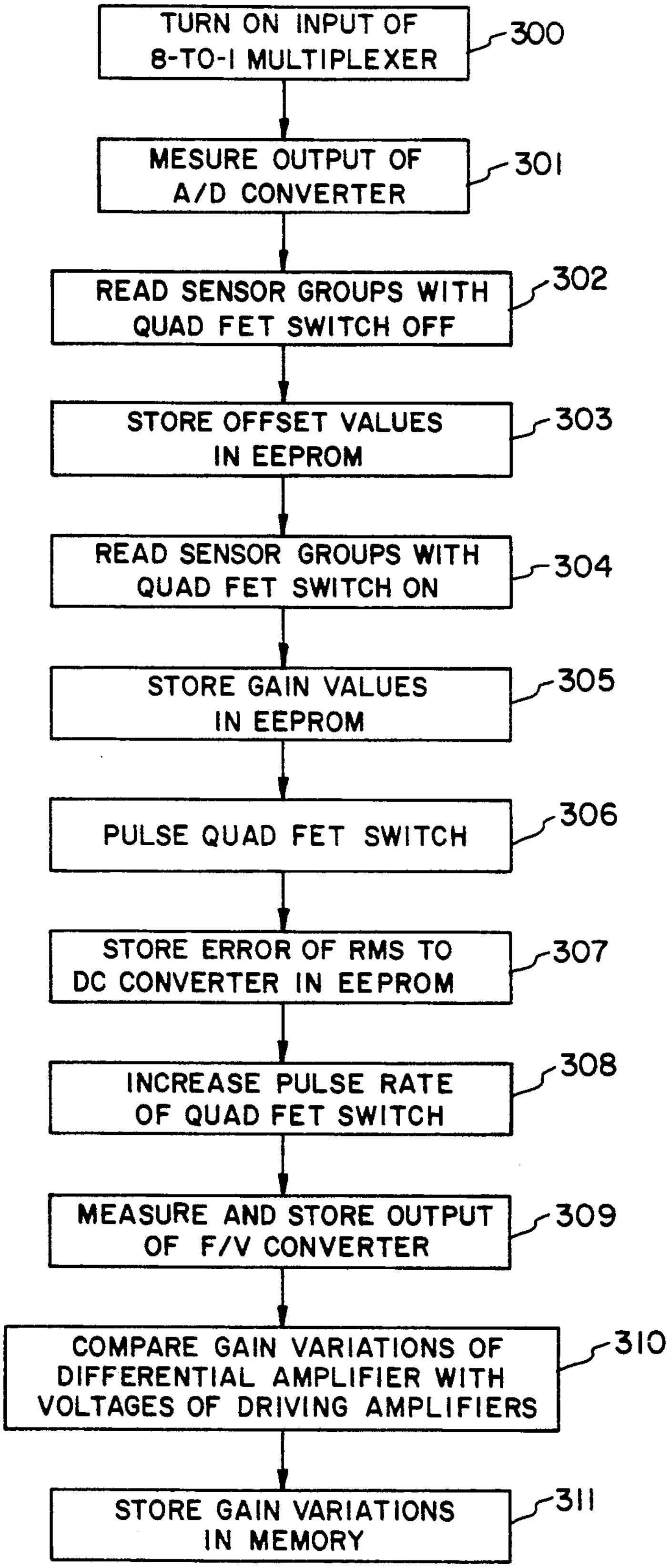

Referring to FIG. 4, quad FET switch 61 helps to provide the self calibrating function. In conventional systems of this type, the analog circuitry has adjustments which must be made at the time of manufacture which require specialized test equipment and are not normally adjustable at the time of installation. Any analog based system, due to component variations, will typically produce a voltage offset error and a gain error. These errors are both time and temperature dependent and require periodic re-calibration to minimize any negative effect on performance. The present invention self calibrates according to the flow chart shown in FIG. 16 and described below, which is performed by the peripheral circuitry and programming of the microprocessor.

The offset error is typically a fixed constant based on linear circuit imperfections but may be a function of gain. Gain errors are a result of linear circuit imperfections and external component tolerances. Conventionally, the calibration method which nulls out offset errors involves adjusting for proper balance of the linear circuits with a reference input voltage source set to zero volts such that the output is a representation of that zero volt input source. Gain errors are conventionally optimized by adjusting external feedback components and applying a known voltage, other than zero, and adjusting the feedback components such that the output of the analog system provides the proper representation of that voltage.

FET switch 61 has, as an input, a low impedance drive source connected to precision voltage reference 54 whose voltage is known within an acceptable tolerance. The control of FET switch 61 is from microprocessor 78 via octal buffer 77. The analog self-test control line can (1) turn on FET switch 61, (2) turn off FET switch 61, or (3) toggle FET switch 61 on and off at any rate desired. The output of analog switch 61 is connected to each of the SENSOR GROUPs and subsequently has resistor 61 coupled to ground. Resistors 62 assure that the inputs will see a zero volt input in the absence of FET switch 61 being turned on.

Additionally, the substantial resistance of resistors 62 assures that the on-resistance of FET switch 61 will not introduce a significant error due to the voltage divider action of the on-resistance in series with resistors 62. The foregoing assumes that the SENSOR GROUPs on-resistance is not a significant contributor to the accuracy of the measurement and that the individual FETs of each SENSOR GROUP are inherently matched in their on-resistance.

Calibration of A/D converter 87 is accomplished by first turning on the D7 input of 8 to 1 multiplexer 58 in step 300, which is connected to a precision voltage reference, and taking a measurement of the A/D converter's output in step 301. This measurement allows the calibration of A/D converter 87 for offset errors. The SENSOR GROUPs and their associated inputs to 8 to 1 multiplexer 58 are next read in step 302 with quad FET switch 61 turned off for an input zero voltage state and the values stored in EEPROM 71 memory as offset values in step 303.

Quad FET switch 61 is next turned on and the readings repeated for a 2.5 volt input condition in step 304 with the gain variations stored in EEPROM 71 memory in step 305. Quad FET switch 61 is then pulsed at a specified rate in step 306 as to verify the 3DB roll-off characteristic of low pass filter 50. The accuracy of RMS to DC converter 51 is verified and the error recorded and stored in EEPROM 71 memory in step 307. Frequency to voltage converter 52 is next verified by increasing the pulse rate of quad FET switch 61 in step 308 and measuring the output voltage and subsequently storing it in step 309. The gain variations of differential amplifier 53 are compared against the individual voltages of driving amplifiers 49 and 48 in step 310 and stored in memory in step 311.

After performing some calculations on the results, the storage of offset and gain constants provides calibrated analog input values having minimal error. This calibration technique is built into the operational software and can be performed at either the manufacturing facility or the site the system is installed.

SELF-TEST FUNCTION

Referring again to FIG. 4 and the above discussion, the self-test function provides a fully self verifying system. The inputs of each sensor group are connected together via an external shorting or jumper, the outputs of the keypad matrix 3 to 8 decoder 85 are connected to each of octal buffers 63, 64, and 65 of the digital interface section, and the output of octal buffers 63, 64, and 65 are looped back to the inputs of the other octal buffers 83 and 84 with the direct inputs of the programmable peripheral interface 84. This connection of inputs and outputs permits the full verification of interface functionality using only a specially wired connector.

This functional verification is performed at the manufacturing facility and may be performed at the site installation. This self-test also consists of keypad verification, display module verification, EEPROM and RAM verification, program memory checksum verification, real time clock verification, and periphery verifications associated with the security features, alarm, and watchdog timer. The system provides a full interconnected configuration to verify all outputs, inputs, and peripherals in the absence of any test equipment. This feature is unique in that both calibration and self-test may be realized at any time or location by unskilled personnel.

ALARM FUNCTION

Referring to FIG. 6, octal buffer 77 is controlled by microprocessor 78 and is directly connected to an alarm (not shown). The alarm serves as an audible or visual output that an alarm condition has occurred. Alarm conditions occur based on (1) an out-of-tolerance sensor condition, (2) a calibration failure, (3) a self-test failure, or (4) a security violation due to forced entry or tampering. This alarm discourages misuse of the system and alerts the user to possible problems associated with the system or interfaces. Being under the control of the microprocessor, the alarm may be tailored to provide different audible or visual stimuli based on the type of alarm condition. The alarm sensor typically will be interfaced with a piezoelectric alarm device and may be pulsed at varying rates to differentiate between alarm conditions.

ANTI-TAMPER/SECURITY FUNCTION

Referring to FIG. 6, the anti-tamper section of the system comprises a control loop interfacing with octal buffer 77 and is adapted for use with a series connection of interlocked sensors. Typical sensors are standard reed contact magnetic switches or micro switches which detect when an attempt to penetrate the system has occurred. The functionality of the anti-tamper is disabled by the proper entry of a unique code into keypad 12 prior to accessing the system. Another adaptation of the anti-taper section involves sensing repeated attempts to illegally access the device through keypad 12 without first using a security access code, wherein such a illegal access causes a security violation condition. The result of either a tamper attempt or illegal keypad access attempt is to sound the alarm in a fashion that only the entry of a disarm code will disable the alarm. This feature precludes the resetting of the system by use of a power cycle action.

The intrusion is time stamped and stored in EEPROM 71 for later display and the existence of a timestamp in a specified EEPROM location can later indicate that a penetration attempt was made and when it was made. The presence of the alarm condition, due to attempted illegal access, does not preclude proper operation of the scanner section but does block any keypad functionality except for the specified disarm code entry.

The system is vulnerable in that the disconnecting of power and the subsequent physical penetration will go undetected but concurrently no electronic modification of the system is possible without having power supplied and thus this vulnerability is not considered significant relative to penetration by the less than the highly technically skilled.

OPERATION OF THE INVENTION

Figure 7:
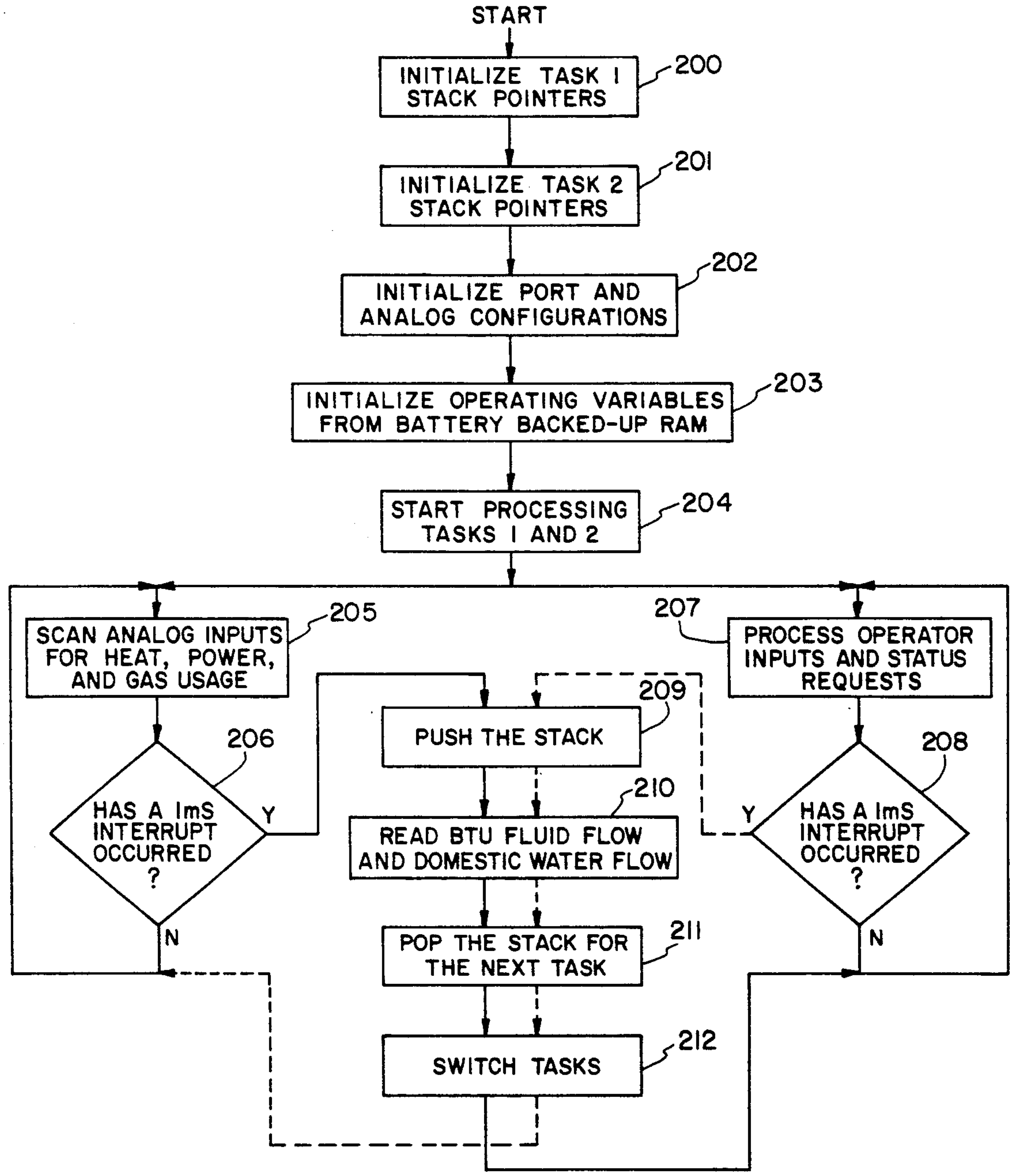
FIGS. 7-16 are flow chart diagrams of the operation of the present invention.

Referring to FIG. 7, the software portion of the invention has two concurrent tasks referred to as task 1 and task 2. Task 1 is the portion of the software that reads the analog data coming into the invention and stores that data. Task 2 is the man-machine interface of the invention and is responsible for controlling the display, reading the keypad, performing calculations, performing calibration, and controlling all peripheral I/O devices except the analog multiplexer.

When power is provided, the microprocessor code starts at a beginning location in the program and initializes the task 1 pointers in step 200 which will serve as the starting point of task 1 and will further serve to define the stack size. In step 201, task 2 pointers are next initialized in a like fashion to the task 1 pointers but at different stack locations. The program next initializes the configurations of all peripherals in step 202 (reference FIG. 5) including display 102, programmable peripheral interface 99, real time clock 96, and the printer interface 101. Referring to FIG. 7, the operating variables are retrieved from battery backed-up RAM in step 203. These are the variables which were the configuration variables in force at the last power down of the system which are maintained in battery back-up RAM memory. Having initialized all operating variables in step 203 and having initialized all necessary peripheral interfaces in step 202, the activation of the concurrent tasks begins at step 204.

Tasks 1 begins first and starts by scanning the analog inputs for consumption data in step 205. Task 1 continues by executing steps 205 & 206 in a control loop until an internal timer within the microprocessor causes a 1 ms interrupt to occur in step 206 which causes the software to save the stack information in step 209, read the water flow and read the BTU fluid flow data in step 210. The task 2 stack, previously initialized, is read in step 211 and task 2 is engaged in step 212. The software then performs the task 2 functions supporting the man-machine interface in step 207. Task 2 continues by executing steps 207 & 208 in a control loop until the internal timer within the microprocessor again causes an interrupt to occur after 1 mS of time in step 208. The process then repeats as before by saving the task 2 stack in step 209, reading water flow and BTU fluid flow data in step 210, pop the stack for the next task in 211, and switch tasks in 212. The task switching (concurrent processing continues until system shut-down.

Figure 8:
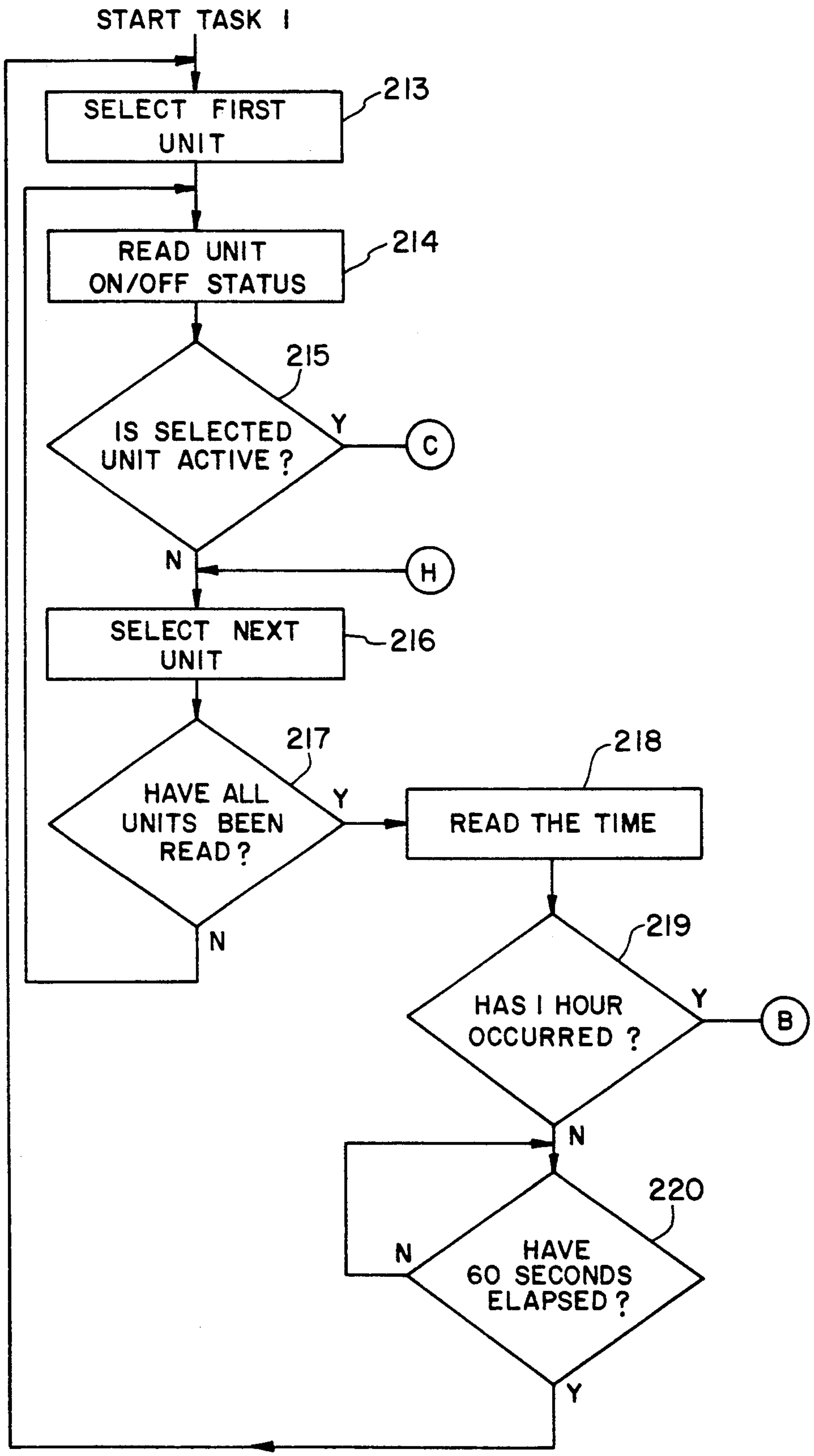

Referring to FIG. 8, Task 1 starts by first selecting 213 the first of the 24 units being metered in step 213. To determine if the unit is active, the unit on/off status is read in step 214 and if the unit is not currently active in step 215, the software abandons the metering of the unit and selects the next unit in step 216. The unit number is checked to assure that it is within the range of the allowable 24 units and if so the previous process is repeated by step 217 returning execution to step 214. If all units have been read in step 217 then the software reads the time in step 218 in the real time clock to determine if the time is an even hour increment in step 219. If a one hour increment has not occurred, then the software waits for sixty seconds (1 minute increment) in step 220 and when one minute has occurred the unit scanning process begins again.

Figure 9:
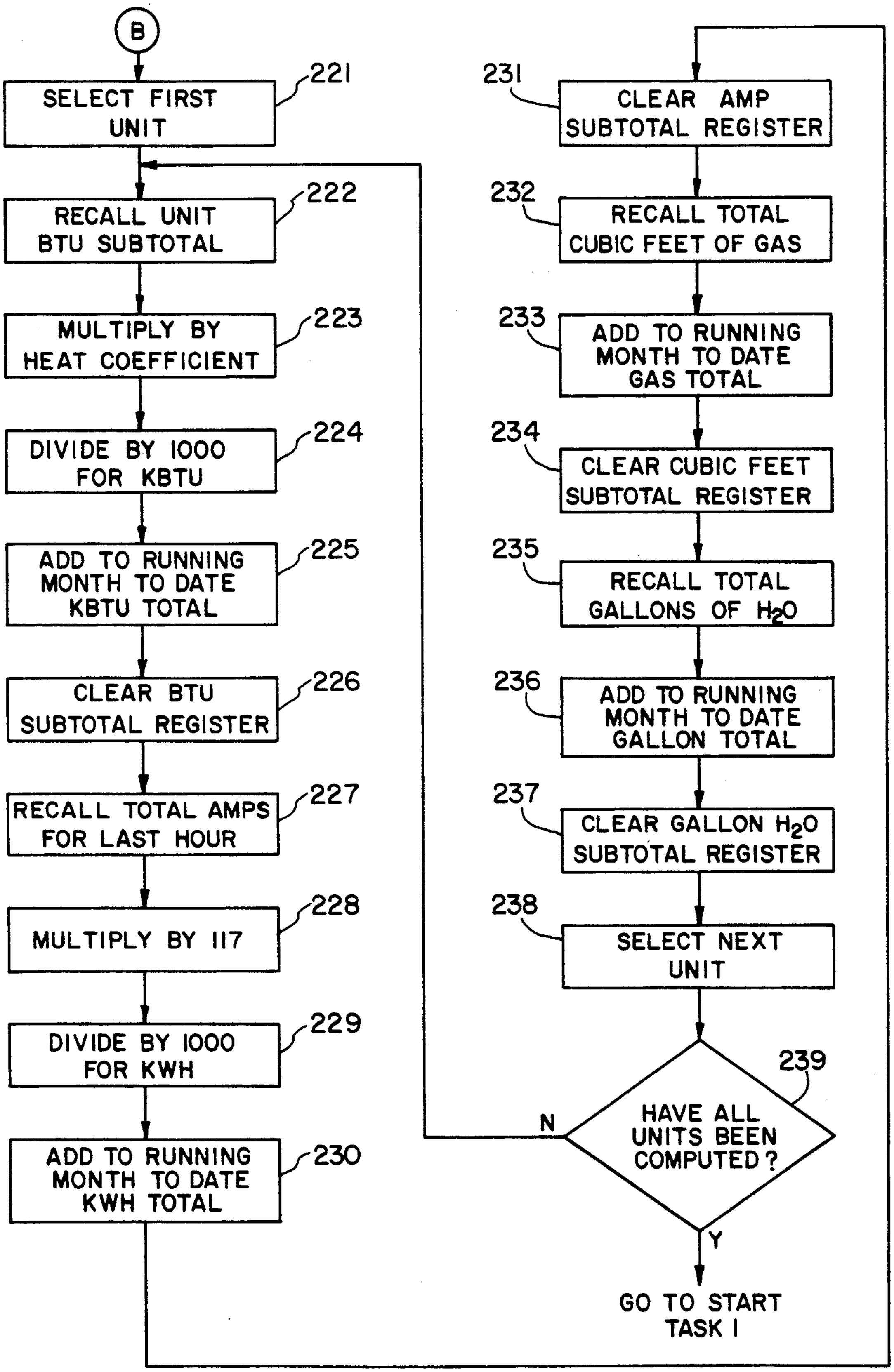

If a one hour increment has occurred in step 219 then a hourly update occurs for all consumption data for the month to date. Referring to FIG. 9, the first unit is selected in step 221 and the BTU consumption subtotal is recalled from memory in step 222 and is multiplied by the fluid heat coefficient in step 223 and divided by one thousand in step 224 to produce a KBTU total which is added to the month to data KBTU total in step 225. The BTU subtotal register is then cleared in step 226 and the total current in amps measured over the past hour is recalled from memory in step 227. The total current in amps is multiplied by one hundred seventeen (117 typical average RMS) in step 228 to obtain Watt-Hours. The Watt-Hour figure is divided by one thousand in step 229 to produce a KWH value for the past hour which is added to the KWH total for the month to data in step 230. The current (amperage) subtotal register is cleared in step 231 and the total cubic feet of gas consumed for the past hour is read from memory in step 232. The cubic feet of gas total is added to the month to data total in step 233 and the subtotal register for the gas is cleared in step 234. Finally, the total gallons or cubic feet of water, used in the last hour, is read from memory in step 235 and added to the month to data total for water in step 236. The gas subtotal register is cleared in step 237 and the next unit of the 24 is selected with the process repeating itself in step 239 looping back to step 202 until all 24 units have been read and the month to date totals updated. The software then returns to the start of task 1 where the first unit is again selected and the process continued.

Figure 10:
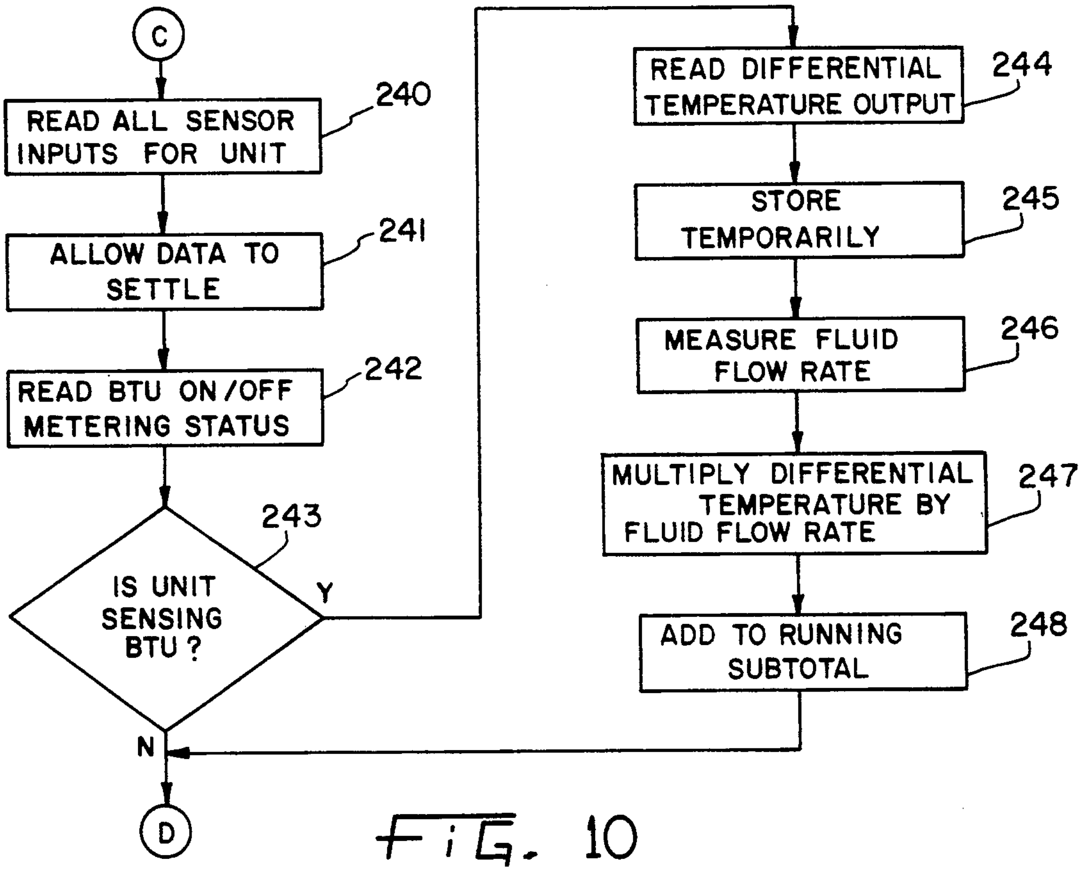

Referring to FIG. 8, if the unit selected in step 213 is active in step 215 then a determination of what sensors are active is next made. Possible sensors include BTU, power, gas flow, or domestic water flow sensors. Referring to FIG. 10, the active unit is read for all sensor inputs in step 240 and time is allowed for the sensors to settle in step 241. This is critical when reading (refer to FIG. 3) the RMS/DC converter 107 or the frequency to voltage converter 108. Referring to FIG. 10 again, the unit status is again read in step 242 and a determination is made in step 243 as to whether the BTU sensors are to be read. If the BTU sensor function is active, the differential temperature is roll in step 244, from the output of the differential amplifier (refer to FIG. 3 item 110) and stored temporarily in memory in step 245. The fluid flow rate measure during the 1 mS interrupt service routine (refer to FIG. 7 item 210) is read in step 246 and multiplied by the differential temperature in step 247. The result consisting of differential temperature times fluid flow rate is added to the running subtotal in step 248 which is kept for an hour before being added to the month to date totals.

Figure 11:
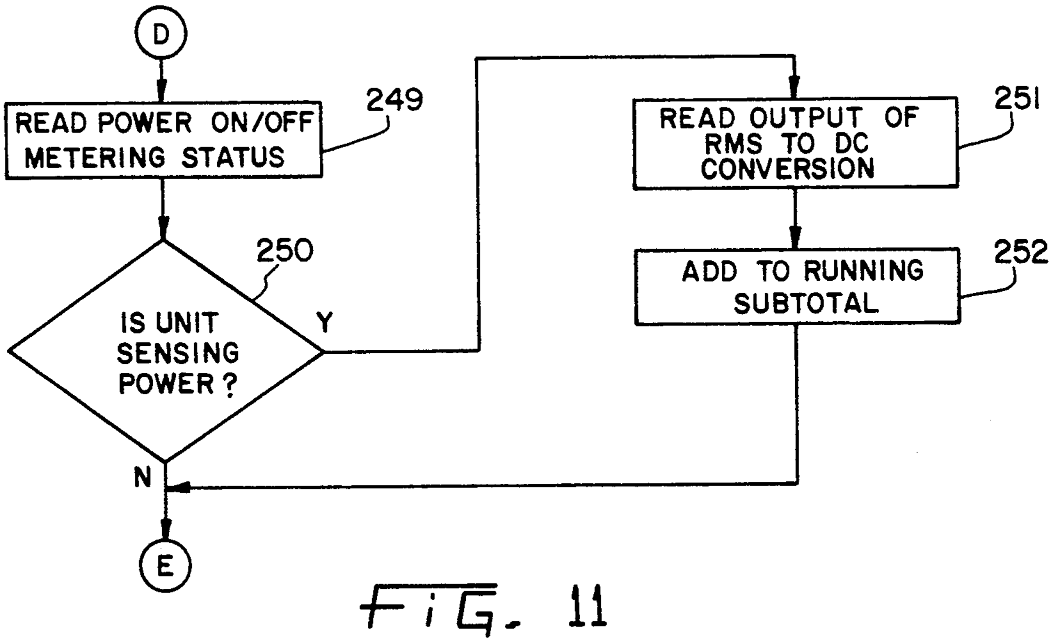

Referring to FIG. 11, the program reads the power sensor status for an on/off condition in step 249 and if power is being sensed in step 250, the software causes the RMS/DC converter (refer to FIG. 3 item 107) to be read in step 251. The reading, being in amps, is added to the running subtotal in step 252 to accumulate the amps consumed for a one hour period or Amp-Hrs.

Figure 12:
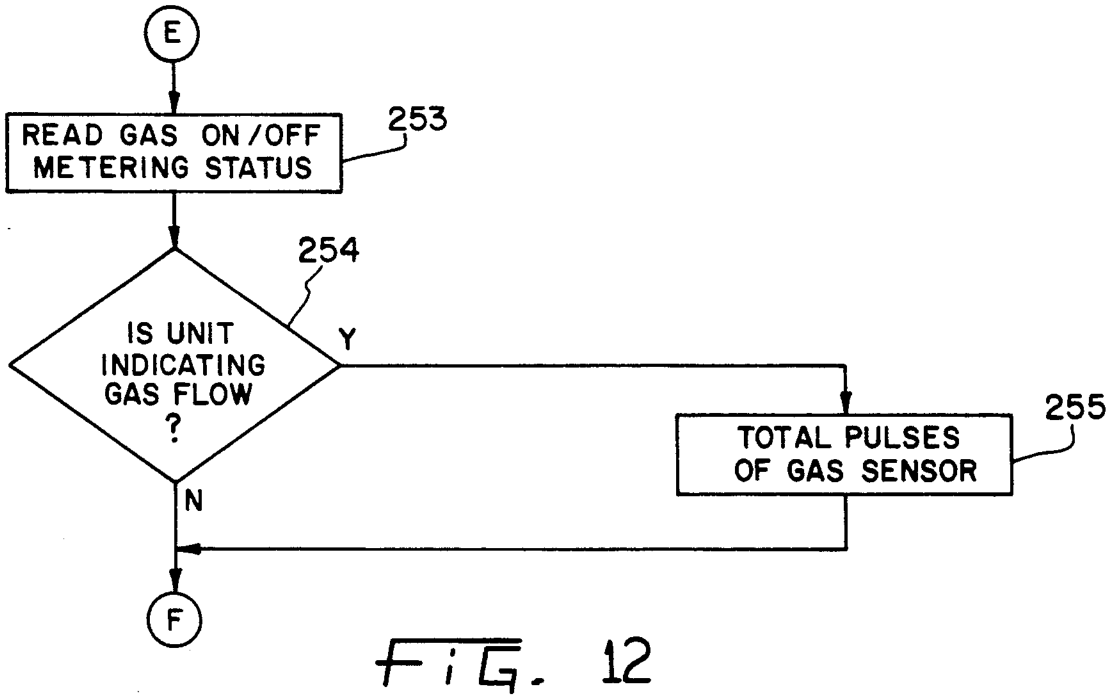
Figure 13:
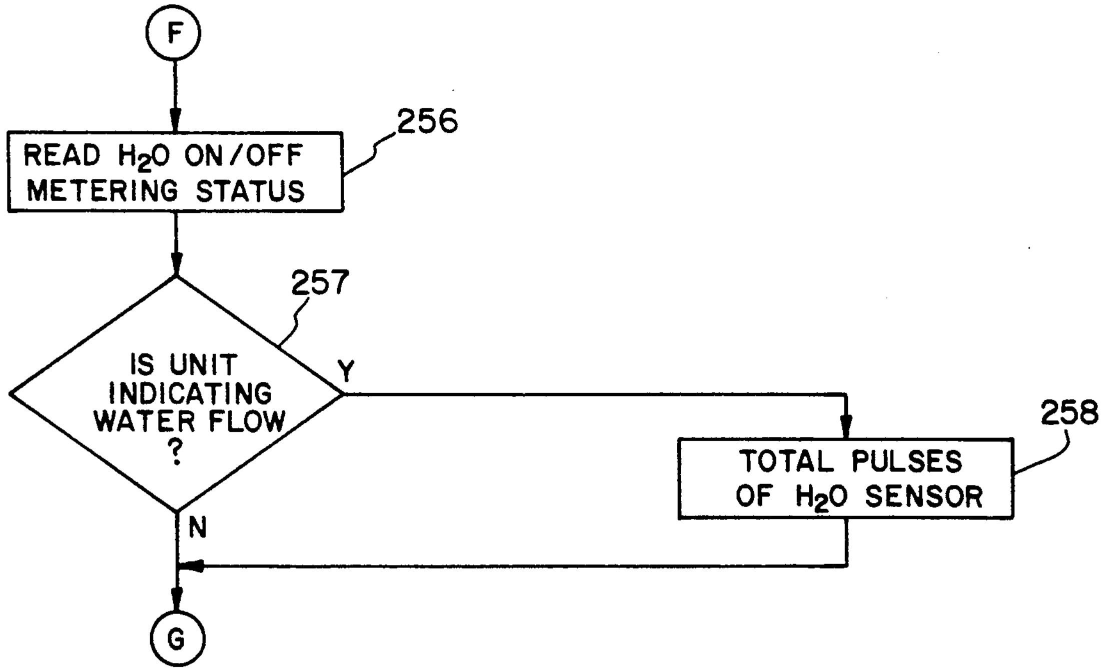

Referring to FIG. 12, the software next reads the gas flow sensor on/off status in step 253 and if the unit is indicating gas flow in step 254, the total pulses for the gas flow are added to the pulse subtotal of cubic feet of gas consumption for current period in step 255. Referring to FIG. 13, the domestic water status is next read in step 256 and if the unit is indicating water flow in step 257, the total number of pulses, read during the interrupt service routing (refer to FIG. 7, step 210) are added to the current period subtotal in step 258. If any of the on/off statuses are shown as off in any of steps 243, 250, 254, 257 then the reading of any data is omitted.

Figure 14:
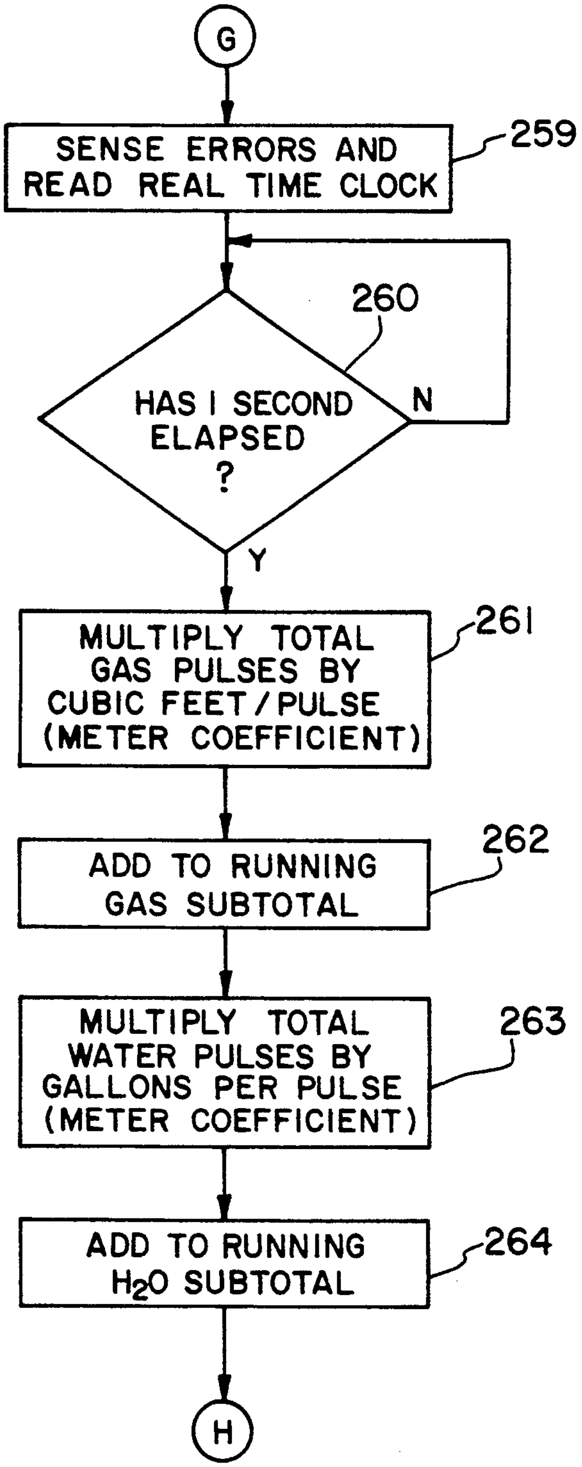

Referring to FIG. 14, the analog sensor data just read is checked for values which indicate open or shorted sensors in step 259. If any such condition is detected, the error condition is saved in memory and a flag is set to signal task 2 that a sensor error has been detected. The time from the real time clock is read (refer to FIG. 3 item 96) and if a one second increment has occurred by step 260 then the period subtotal gas pulses are read from memory and multiplied in step 261 by a cubic feet/pulse factor stored in memory with the result in cubic feet of gas being added in step 262 to the running gas cubic feet subtotal for the hour. The water pulses are next read from memory in step 263 and multiplied by the gallon/pulse or cubic feet/pulse factor stored in memory with the total in gallons or cubic feet of water being added to the hour subtotal in step 264 for domestic water consumption.

Referring to FIG. 8, the software selects the next unit in step 216 and the process continues as previously described. As a point of clarification, the differential temperature consists reading of an analog voltage as does the current flow (Amperage) reading. The domestic water consumption consists of a digital signal consisting of a pulse from the sensor meter at fixed consumption rates (tens or hundreds of gallons or cubic feet). The gas sensor can be read either as a digital input in the form of a pulse or as an output from the frequency to voltage converter which comprises an analog voltage. The determination is made based on the type of sensor meter selected and the resulting pulse rate provided by the sensor.

The task 2 software has four basic functions. The first function includes programming variables into the memory, clears memory, and performs integrity checks on the unit (self test). The second function is the display of variable and constant data, display of month to date consumption data, display of month to date utility costs, and the display of system status, errors, and time. The third function in task 2 is a calibration function which serves to calibrate the analog portion circuitry automatically. The fourth function is a printer hard copy function which provides a printed subset of the display data for paper archives.

Referring to FIG. 3, the programming function consists simply of a set of software routines which, based on two key entries on to keyboard 100, cause the display 102 to prompt the operator for specified data involving variable storage involving rates, sensors, and fluid factors, real time, and specialized routine engagement involving memory clearing and self test. Basically, any action involving memory validation or interface is initiated through this routine.

Figure 15:
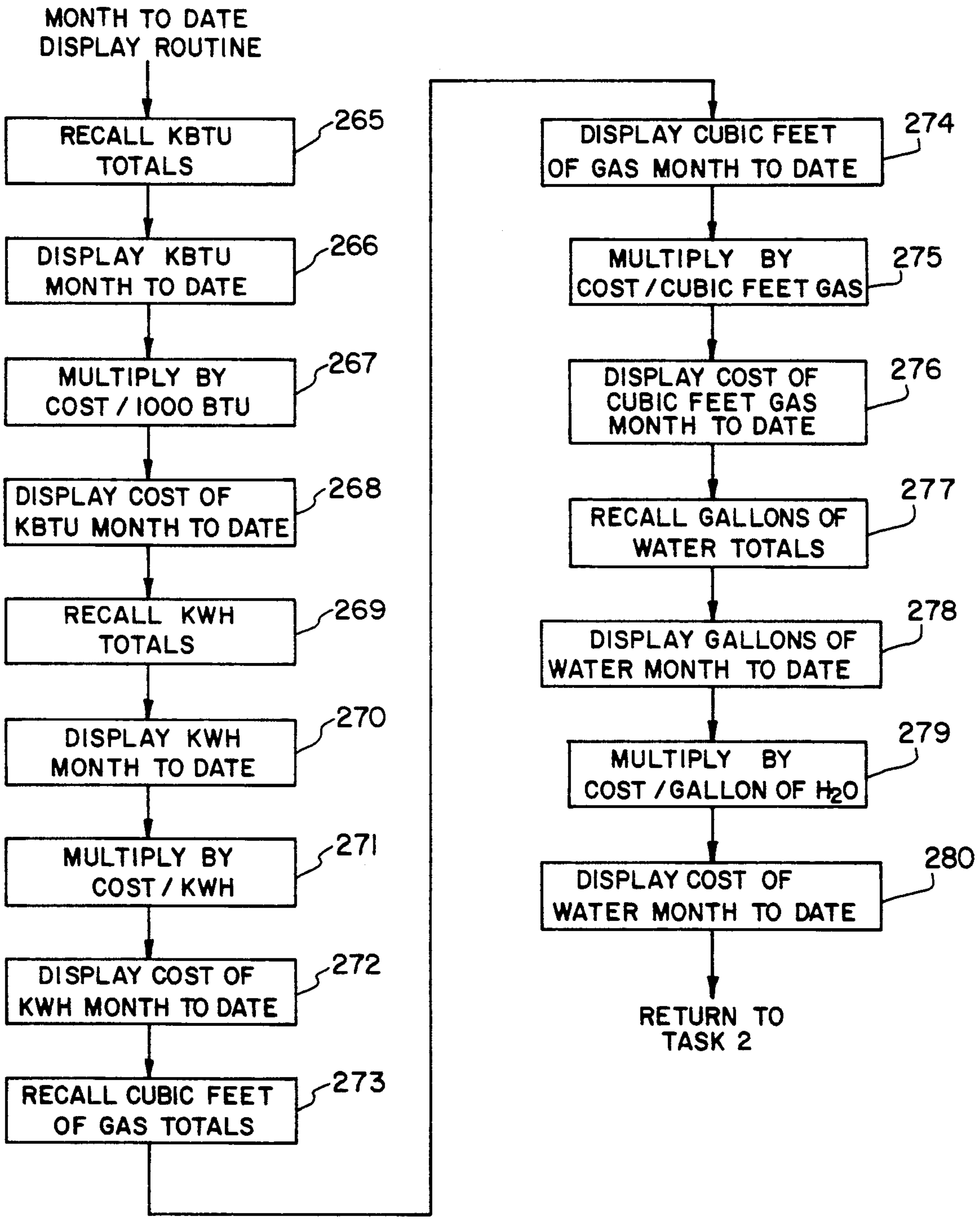

The display routine is a validation process to verify that the data entered in the programming routine is accurate and a routine to allow the display of month to date data for each units sensor consumptions and associated costs. Referring to FIG. 15, the flow chart depicted is an exemplary embodiment of the display routine of the present invention. The flow chart illustrates the process of displaying consumption data and costs for the current month to date, although many different arrangement may be devised. The operator requests that the display recall all month to date data for all units or for a specified unit. In doing so the software first recalls the KBTU totals for a specified unit from memory in step 265 and displays the total in step 266 to the requester of the data. The total KBTU data is next multiplied in step 267 by a programmed rate consisting of the cost/KBTU. The resulting calculation of cost for KBTU for the month to date is displayed to the requester in step 268. The software repeats the process for KWH consumption in steps 269, 270 and KWH cost in steps 271, 272, gas consumption in steps 273, 274, and gas cost in steps 275, 276, and finally water consumption in steps 277, 278 and water cost in steps 279, 280 for a specified unit. The print routine is functionally similar to the display routine except the data is summarized for hard copy media output or for specified billing output for individual units.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for individually monitoring utility resource consumption in a multi-occupant dwelling, said system comprising:

a plurality of utility receiving means for providing utility resources to occupants of the multi-occupant dwelling;

a plurality of sensors operably coupled to said utility receiving means, each said sensor producing a signal indicative of measured utility consumption;

processor means for observing, recording, and calculating the cost of utility consumption; and interface means for individually and selectively receiving said utility consumption signals, said utility consumption signals including at least two signals employing different communications schemes, said interface means also for providing a digital signal corresponding to a selected one of said utility consumption signals for use by said processor means, said interface means operably interconnecting said processor means with each said sensor;

said processor means including means for self calibrating said measured utility consumption according to dynamically calculated gain and offset parameters stored in said processor means for each one of said sensors.

2. The system of claim 1 wherein said processor means includes non-volatile memory for storing said gain and offset parameters.

3. The system of claim 1 wherein said processor means includes memory and programming stored in said memory, said programming providing for multitasking, and one of said tasks including receiving said digital signal from said interface means and recording cost of utility consumption values calculated from said digital signal.

4. The system of claim 1 further including a real time clock connected to said processor means, said real time clock producing a timing signal used in said calculation of cost of utility consumption.

5. The system of claim 1 wherein said calibration means includes means for producing at least two reference utility consumption signals, each said reference signal having a predetermined mutually exclusive value, whereby said processor means calculates said gain and offset parameters according to said digital signals which are provided in response to said reference signals.

6. The system of claim 1 further including data input means for receiving commands, and data display means for displaying cost of utility consumption, said data input means and said data display means operably coupled to said processor means.

7. The system of claim 6 wherein said processor means includes memory and programming stored in said memory, said programming providing for multitasking, and one of said tasks including receiving a command from said data input means and displaying cost of utility consumption values on said display means in accordance with said command.

8. A system for individually monitoring utility resource consumption in a multi-occupant dwelling, said system comprising:

a plurality of utility receiving means for providing resources to occupants of the multi-occupant dwelling;

a plurality of sensors operably coupled to said utility receiving means, each said sensor producing a signal indicative of measured utility consumption;

processor means for observing, recording, and calculating cost of utility consumption; and interface means for receiving said utility consumption signal and providing a digital signal for use by said processor means, said interface means operably connected to each said sensor and said processor means;

said interface means including means for selectively activating at least two reference signals and providing digital signals corresponding to said reference signals for use by said processor means to calculate gain and offset parameters stored in said processor means for each one of said sensors, each said reference signal having a predetermined mutually exclusive value;

said processor means including memory and programming stored in said memory, said programming providing for multi-tasking, and one of said tasks including receiving said digital signal from said interface means and recording cost of utility consumption values calculated from said digital signal.

9. The system of claim 8 wherein said processor means includes non-volatile memory for storing said gain and offset parameters.

10. The system of claim 8 further including data input means for receiving commands, and data display means for displaying cost of utility consumption, said data input means and said data display means operably coupled to said processor means.

11. The system of claim 10 wherein one of said tasks of said multi-tasking programming includes receiving a command from said data input means and displaying cost of utility consumption values on said display means in accordance with said command.

12. A system for individually monitoring utility resource consumption in a multi-occupant dwelling, said system comprising:

a plurality of utility receiving means for providing desired resources to occupants of the multi-occupant dwelling;

a plurality of first sensors operably coupled to said utility receiving means, each said first sensor producing a first signal indicative of measured utility consumption;

a plurality of second sensors operably coupled to said utility receiving means, each said second sensor producing a second signal indicative of measured utility consumption, said second signal employing a communication scheme which is distinguishable from said first signal;

processor means for observing, recording, and calculating cost of utility consumption; and interface means for receiving said first and second signal and providing a digital signal for said processor means, said interface means operably connected to each said sensor and said processor means;

said interface means including means for selecting one of said first sensors and said second sensors according to said processor means to thereby provide said digital signal.

13. The system of claim 12 wherein said first signal has a signal characteristic including one of the group consisting of voltage varying, frequency varying, amplitude sensitive varying, and large period varying characteristics, and said second signal has a signal characteristic including another of the group consisting of voltage varying, frequency varying, amplitude sensitive varying, and large period varying characteristics.

14. The system of claim 12 further comprising a communication bus operably connecting said processor means and said interface means, said communication bus including a plurality of bus lines, and said processor means including a multiplexing means for activating said selecting means, said multiplexing means in communication with a portion of said bus lines and sending an activation signal to one of said sensors according to said selecting means.

15. The system of claim 12 wherein said processor means includes memory and programming stored in said memory, said programming including periodically checking each said sensor for possible alarm conditions.

16. The system of claim 12 wherein said interface means includes an analog-to-digital signal converter and a schmitt trigger digital-to-digital signal converter.

17. The system of claim 12 further comprising an address bus including a plurality of address lines, said processor means including memory for storing programming and data, wherein a first subset of said address lines are operably connected to said memory for addressing memory locations, and a second subset of said address lines are operably connected to said interface means for selecting one of said first and second sensors.

18. The system of claim 17 further comprising a data bus comprised of a subset of said address lines, said data bus and said second subset being mutually exclusive.

19. The system of claim 12 wherein said interface means includes a switching means for activating an analog self-test control line which provides a known signal whereby said processor means can compare a digital signal output from said known signal with digital signal output of one of said first and second sensor groups.

20. The system of claim 19 wherein said switching means also can switch said analog self-test line on and off to provide a known frequency signal whereby said processor means can compare a digital signal output from said known frequency signal with a digital signal output of one of said first and second sensor groups.

* * * * *